US005974765A

United States Patent [19]

Weder et al.

[11] Patent Number: 5,974,765

[45] Date of Patent: Nov. 2, 1999

[54] METHOD FOR PROVIDING A DECORATIVE COVER ABOUT A FLORAL GROUPING

[75] Inventors: Donald E. Weder; Joseph G. Straeter, both of Highland; William F. Straeter, Breese, all of Ill.

[73] Assignee: Southpac Trust International, Inc.

[21] Appl. No.: 08/906,419

[22] Filed: Aug. 5, 1997

Related U.S. Application Data

[63] Continuation of application No. 08/465,480, Jun. 5, 1995, Pat. No. 5,687,546.

[51] Int. Cl.$^{6}$ ............................ B65B 11/02; B65B 11/48; B65B 25/02

[52] U.S. Cl. ................................ 53/397; 53/399; 53/465; 53/419

[58] Field of Search ............................. 53/399, 397, 419, 53/416, 417, 465, 461, 414, 390, 219; 206/423

[56] References Cited

U.S. PATENT DOCUMENTS

| | | | |
|---|---|---|---|
| 809,299 | 1/1906 | Henke et al. | 53/465 X |
| 1,446,563 | 2/1923 | Hughes . | |
| 1,616,804 | 2/1927 | Ingram . | |
| 2,170,147 | 8/1939 | Lane | 286/56 |
| 2,371,985 | 3/1945 | Freiberg | 206/46 |
| 2,529,060 | 11/1950 | Trillich | 117/68.5 |
| 2,994,424 | 8/1961 | Selby et al. | 206/423 |
| 3,134,679 | 5/1964 | Dreyfus | 99/171 |
| 3,271,922 | 9/1966 | Wallerstein et al. | 53/3 |
| 3,273,302 | 9/1966 | Walter | 53/39 |
| 3,322,325 | 5/1967 | Bush | 229/62 |
| 3,376,666 | 4/1968 | Leonard | 47/41 |
| 3,403,840 | 10/1968 | Mathes | 229/51 |
| 3,508,372 | 4/1970 | Wallerstein et al. | 53/3 |
| 4,006,561 | 2/1977 | Thoma et al. | 206/423 X |
| 4,054,166 | 10/1977 | Burke | 206/423 |
| 4,765,464 | 8/1988 | Ristvedt | 206/0.82 |
| 4,801,014 | 1/1989 | Meadows | 206/423 |
| 5,111,638 | 5/1992 | Weder | 53/397 |
| 5,205,108 | 4/1993 | Weder et al. | 53/397 |
| 5,307,605 | 5/1994 | Straeter | 53/397 |
| 5,335,475 | 8/1994 | Weder et al. | 53/397 |
| 5,335,476 | 8/1994 | Weder | 53/397 |
| 5,335,477 | 8/1994 | Weder | 53/397 |
| 5,339,601 | 8/1994 | Weder et al. | 53/397 |
| 5,353,575 | 10/1994 | Stepanek | 53/461 |
| 5,373,942 | 12/1994 | Weder | 206/423 |
| 5,428,939 | 7/1995 | Weder et al. | 53/397 |
| 5,651,232 | 7/1997 | Weder | 53/399 X |
| 5,661,950 | 9/1997 | Weder | 53/465 X |

FOREIGN PATENT DOCUMENTS

| | | |
|---|---|---|
| 1276058 | 10/1961 | France . |
| 9315979 | 8/1993 | WIPO . |

*Primary Examiner*—James F. Coan
*Attorney, Agent, or Firm*—Dunlap, Codding & Rogers, P.C.

[57] ABSTRACT

A method for both wrapping a floral arrangement and removing the wrapping material from the floral arrangement, comprising a sheet of material having a pull tab and pull indicia thereon, the pull tab sized to be easily graspable, a bonding material disposed on the sheet of material near the pull tab. A floral arrangement is utilized, the floral arrangement being wrapped in the sheet of material, the sheet of material being crimped about a portion of the floral arrangement.

26 Claims, 11 Drawing Sheets

METHOD FOR PROVIDING A DECORATIVE COVER ABOUT A FLORAL GROUPING

This application is a continuation of U.S. Ser. No. 08/465,480, filed Jun. 5, 1995, entitled METHOD FOR PROVIDING A DECORATIVE COVER ABOUT A FLORAL GROUPING, now U.S. Pat. No. 5,687,546.

FIELD OF THE INVENTION

This invention generally relates to wrapping materials and, more particularly, to wrapping materials having a pull tab and pull indicia for both wrapping a floral arrangement and removing the wrapping material from a floral arrangement, and the method of using same.

In another aspect, the invention relates to decorative coverings for floral arrangements, and more particularly, but not by way of limitation, to wrapping a sheet of material about a floral arrangement and extending a band about a portion of the decorative covering to form a crimped portion in the decorative covering.

DESCRIPTION OF THE PREFERRED EMBODIMENTS

DEFINITIONS

Figure 1:
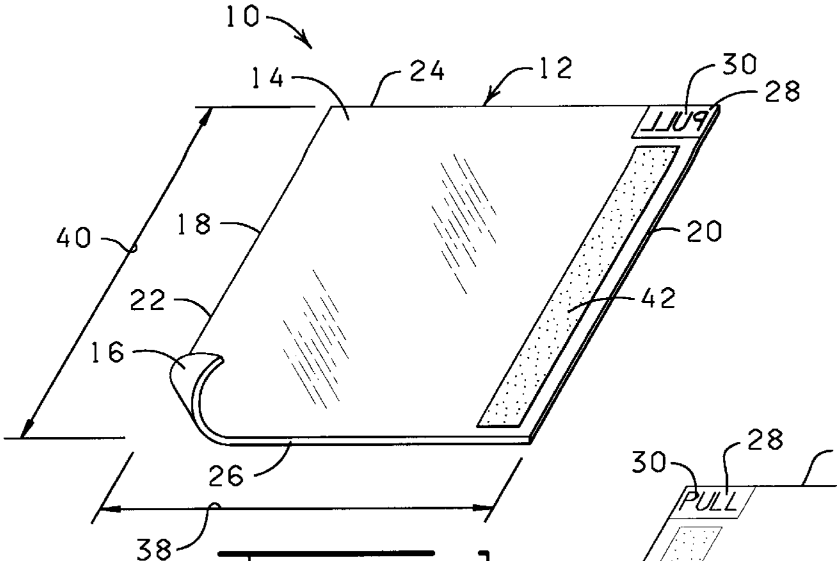
FIG. 1 is a perspective view of a wrapping material showing an upper surface, the wrapping material being transparent and having a bonding material extending along one side, a pull tab and pull indicia being located immediately above a bonding material.

Floral arrangement as used herein means cut fresh flowers, artificial flowers, other fresh and/or artificial plants or other floral materials and may include other secondary plants and/or ornamentation which add to the aesthetics of the overall floral arrangement.

Polymer as used herein means any polymer film. For example, but not by way of limitation, one polymer film is a polypropylene film. Another example of a polymer film, but not by way of limitation, is cellophane.

Bonding material when used herein means an adhesive, preferably a pressure sensitive adhesive, or a cohesive. Where the bonding material is a cohesive, a similar cohesive material must be placed on the adjacent surface for bondingly contacting and bondingly engaging with the cohesive material. The term “bonding material” also includes materials which are heat sealable and, in this instance, the adjacent portions of the material must be brought into contact and then heat must be applied to effect the seal. The term “bonding material” also includes materials which are sonic sealable and vibratory sealable. The term “bonding material” when used herein also means a heat sealing lacquer which may be applied to the sheet of material and, in this instance, heat, sound waves, or vibrations, also must be applied to effect the sealing.

The term “bonding material” when used herein also means any type of material or thing which can be used to effect the bonding or connecting of the two adjacent portions of the material or sheet of material to effect the connection or bonding described herein. The term “bonding material” also includes ties, labels, bands, ribbons, strings, tape, staples or combinations thereof. Some of the bonding materials would secure the ends of the material while other bonding material may bind the circumference of the wrapper. Another way to secure the wrapping is to heat seal the ends of the material to another portion of the material. One way to do this is to contact the ends with an iron of sufficient heat to heat seal the material.

The term “bonding material” when used herein also means any heat or chemically shrinkable material, and static electrical or other electrical means, magnetic means, mechanical or barb-type fastening means or clamps, curl-type characteristics of the film or materials incorporated in the sheet of material which can cause the material to take on certain shapes, and any type of welding method which may weld portions of the sheet to itself.

Varying bonding characteristics as used herein means less adhesion or cohesion of portions of the bonding material, that is, less “tack” of portions of the bonding material.

Release Material as used herein means a material capable of reducing the tacky properties of a bonding material when the release material is disposed in a covering position over the bonding material and which does not adversely effect the binding characteristics of the bonding material to the sheet of material when the sheet of material is wrapped about a floral arrangement. Release materials satisfying the above requirements are well known and include wax and other commercially available release agents such as Release Coat No. 30 marketed by the Michelman Company of Cincinnati, Ohio and an aqueous silicone admixture containing about 14 weight percent “Syl-off 1171” (a silicone containing composition marketed by Dow Corning Co. of Midland, Mich.), about 0.7 weight percent “Syl-off 1171A (a silicone containing composition markets by Dow Corning Co. of Midland, Mich.) and about 2 weight percent carboxymethyl cellulose.

Band when used herein means any material which may be secured about sheet of material disposed about a floral arrangement and includes elastic or non-elastic string or an elastic piece of material, a non-elastic piece of material, a round piece of material, a flat piece of material, a ribbon, a piece of paper strip, a piece of plastic strip, a piece of wire, a tie wrap or a twist tie or combinations thereof or any other device capable of gathering the sheet of material to removably or substantially permanently form a crimped portion and secure the crimped portion formed in the sheet of material which may be secured about a floral arrangement. The band also may include a bow if desired in a particular application. Such a band may be included as a part of the pull tab (described below) or may comprise the pull tab, however, the pull tab may not comprise a band, and the pull tab may be used without a band attached thereto as well.

Pull tab as used herein means a portion of a sheet of material, near an outer periphery of the sheet of material, preferably near at least one side of the sheet of material, wherein the sheet of material may be easily grasped by an operator (between the operators fingers, or between the operator's thumb and at least one finger) and lifted and unwrapped from itself and the floral arrangement.

Pull indicia as used herein means symbols, such as arrows, or a small picture of the lifted edge of a sheet of material, or a round dot, circle, square, or the like, or printed words, such as "pull," "pull here," "lift here," "lift to release," "lift," or any symbol or words which would indicate that the sheet of material could be unwrapped by starting at that specific point, or any combination of words and/or symbols.

Cling Wrap or Material when used herein means any material which is capable of connecting to the sheet of material and/or itself upon contacting engagement during the wrapping process and is wrappable about an item whereby portions of the cling material contactingly engage and connect to other portions of the wrapping material for generally securing the sheet of material wrapped about at least a portion of the item. This connecting engagement is preferably temporary in that the wrapping material may be easily removed without tearing same, i.e., the cling material "clings" to the wrapping material. A wrapping material which remains securely connected to and about the wrapped item until the wrapping material is torn therefrom.

The cling material is constructed and treated if necessary, from polyethylene such as Cling Wrap made by Glad®, First Brands Corporation, Danbury, Conn. The thickness of the cling material will, in part, depend upon the thickness of the sheet of material utilized, i.e., generally, the thicker and therefore heavier sheet of material may require a thicker and therefore stronger cling material. The cling material will range in thickness from less than about 0.2 mils to about 10 mils, and preferably less than about 0.6 mils to about 2.5 mils and most preferably from less than about 0.6 mils to about 2 mils. However, any thickness of cling material may be utilized in accordance with the present invention which permits the cling material to function as described herein. It will be appreciated that the pull tab (described in detail below), the sheet of material, or any portion of either, may comprise cling material.

BACKGROUND

Floral arrangements are usually wrapped in a wrapping material to protect the delicate blooms and foliage from damage. The wrapping material utilized frequently has some bonding material thereon, such as an adhesive or cohesive, so that the wrapping material retains its wrapped shape, and securely encompasses the floral arrangement in order to protect it. This type of wrapping material, however, has its disadvantages.

A significant disadvantage occurs when the wrapping material is removed from the floral arrangement. Frequently, it is not obvious where the wrapping material begins or ends. When this occurs, the recipient of the floral arrangement may become frustrated in looking for the edge of the wrapping material, and may, in a state of frustration, tear the wrapping material away from the delicate floral arrangement, damaging the blooms, foliage, or both. A further disadvantage is that, even when it is obvious where the wrapping material begins and ends, it is difficult to release the bonding material which holds the wrapping material about the floral arrangement. The recipient may again inadvertently damage the blooms and/or foliage of the floral arrangement in his/her struggle to lift and release a portion of the bonded wrapping material from itself. As a result, again, damage to the floral arrangement is likely. Such damage interferes with the recipient's enjoyment of the beauty and visual quality of the gift of a floral arrangement.

The present invention contemplates a wrapping material which has a bonding material thereon (the bonding material being described in detail below) which enhances the ability to wrap a floral arrangement. The present invention also contemplates a wrapping material which is readily removed, that is, a wrapping material which also has a pull tab and pull indicia which permits the edge of the wrapping material to be identified, and which permits the bonding material to be more readily released from the wrapping material, so that the wrapping material can be quickly and easily removed from the floral arrangement without causing damage to the delicate and fragile blooms and foliage. The present invention also contemplates crimping of the wrapping near the stem end of a floral arrangement, that is, crimping the wrapping material after it is rolled about a floral arrangement and formed into a wrapping/wrapper. Either the bonding material, the pull tab, a band or a combination thereof act to crimp the wrapping/wrapper about the floral arrangement, and retain the wrapping/wrapper thereabout in a crimped condition.

Figure 2:
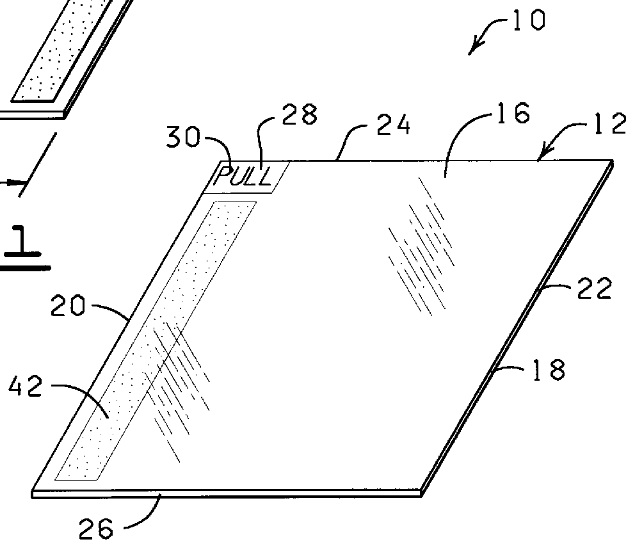
FIG. 2 is a perspective view of the wrapping material of FIG. 1, but showing a lower surface thereof.

The Embodiment of FIGS. 1–2

Referring to FIGS. 1 and 2, designated generally by the reference numeral 10 is a wrapping material which is constructed in accordance with the present invention. The wrapping material 10 comprises at least one sheet of material 12. The sheet of material 12 has an upper surface 14, a lower surface 16 (one edge of the sheet material lifted for illustration purposes only), and an outer periphery 18. The outer periphery 18 of the sheet of material 12 further comprises a first side 20, a second side 22, a third side 24, and a fourth side 26. The sheet of material 12 also has a pull tab 28 and pull indicia 30, which are described in detail below.

Figure 6:
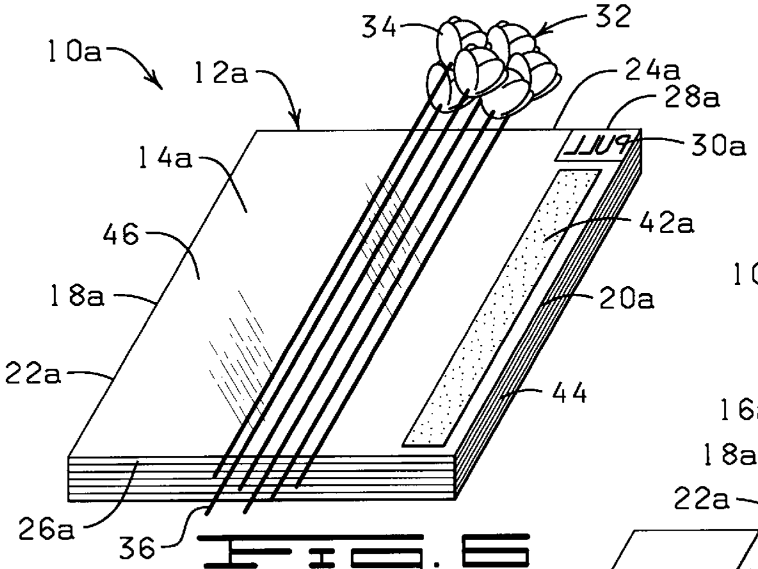
FIG. 6 is a perspective view of the wrapping material of FIG. 3, but showing a floral arrangement disposed thereon.

The sheet of material 12 is utilized to wrap a floral arrangement 32 (FIG. 6). The floral arrangement 32 comprises a flower portion 34 which may comprise either a bloom or a foliage portion, and the floral arrangement 32 also comprises a stem portion 36. However, it will be appreciated that the floral arrangement 32 may consist of only a single bloom or only foliage (not shown). It will be understood that the term "floral arrangement" is used herein interchangeably with the term "floral grouping."

In the embodiment of FIG. 1, the sheet of material 12 is square. It will be appreciated, however, that any shape or size of sheet of material 12 may be used to wrap a floral arrangement 32 as long as it is sufficiently sized and shaped to wrap and encompass the floral arrangement 32. For example, the sheet of material 12 may also comprise other geometric and non-geometric shapes. When multiple sheets of material 12 are used together, they may be connected together or laminated, or may comprise separate layers. Finally, it will be appreciated that the sheet of material 12 shown in all embodiments herein is substantially flat. The sheet of material 12 may be constructed of a single sheet of material 12 or a plurality of sheets of material 12. Any thickness of the sheet of material 12 may be utilized in accordance with the present invention as long as the sheet of material 12 may be wrapped about a floral arrangement 32 and removed from the floral arrangement 32, as described herein. Typically the sheet of material 12 has a thickness in a range of less than about 0.2 mils to about 30 mils. In one embodiment, the sheet of material 12 is constructed from one sheet of polymer film having a thickness in a range of from less than about 0.5 mils to about 2.5 mils. In an alternate embodiment, the sheet of material is constructed from polymer film having a thickness in a range of from less than about 0.2 mils to about 10 mils.

The sheet of material 12 is constructed from any suitable material that is capable of being wrapped about a floral arrangement 32. Preferably, the wrapping material 10 comprises paper (untreated or treated in any manner), cellophane, foil, polymer film, fiber (woven or non-woven or synthetic or natural), cloth (woven or non-woven or natural or synthetic), burlap, or any combination thereof.

The sheet of material 12 may vary in color. Further, the sheet of material 12, may consist of designs which are printed, etched, and/or embossed; in addition, the sheet of material 12 may have various colorings, coatings, flockings, and/or metallic finishes, or be characterized totally or partially by pearlescent, translucent, transparent, iridescent, or the like characteristics. Each of the above-named characteristics may occur alone or in combination. Moreover, each surface of the sheet of material 12 may vary in the combination of such characteristics.

The sheet of material 12 has a width 38 (FIG. 1) extending generally between the first side 20 and the second side 22, respectively, sufficiently sized whereby the sheet of material 12 can be wrapped about and substantially surrounded and compass a floral arrangement 32. The sheet of material 12 has a length 40 (FIG. 1) extending generally between the third side 24 and the fourth side 26, respectively, sufficiently sized whereby the sheet of material 12 extends over a substantial portion of the floral arrangement 32 when the sheet of material 12 has been wrapped about the floral arrangement 32 in accordance with the present invention shown and described in detail herein.

The sheet of material may further comprise an ink, dye, and/or pigment (not shown). Such inks, dyes, and pigments are known in the art, and are commercially available, and may be disposed upon or incorporated in the sheet of material 12 by any method described herein or known in the art. For example, the ink, dye, or pigment may form a portion of a design or decoration on the sheet of material, such as flowers, leaves, and the like.

The sheet of material 12 also comprises a bonding material 42. The bonding material 42 may comprise varying bonding characteristics when disposed on certain portions of the sheet of material 12 so that the bonding material 42 may have less bonding characteristics or tack at or near the pull tab 28.

Further, the bonding material 42 may also comprise at least one color derived from dye, ink, and/or pigment, as previously described herein. Bonding materials as described above, are known in the art and commercially available.

A bonding material 42 is disposed upon the sheet of material 12, i.e., on the upper surface 14, the lower surface 16, or a combination thereof. The bonding material 42, as previously described, is preferably a pressure sensitive adhesive. Such use of adhesives, and particularly pressure sensitive adhesives is taught in U.S. Pat. No. 5,111,638, entitled, "Method For Wrapping An Object With A Material Having Pressure Sensitive Adhesive Thereon," which is hereby incorporated by reference herein.

The sheet of material used herein may further comprise at least one scent (not shown). Examples of scents utilized herein include (but are not limited to) floral scents (flower blossoms, or any portion of a plant), food scents (chocolate, sugar, fruits), herb or spice scents (cinnamon), and the like. Additional examples of scents include flowers (such as roses, daisies, lilacs), plants (such as fruits, vegetables, grasses, trees), foods (for example, candies, cookies, cake), food condiments (such as honey, sugar, salt), herbs, spices, woods, roots, and the like, or any combination of the foregoing. Such scents are known in the art, and are commercially available.

The scent may be disposed upon the sheet of material 12 by spraying the scent thereupon, painting the scent thereupon, brushing the scent thereupon, lacquering the scent thereupon, immersing the sheet of material in a scent-containing liquid, exposing the sheet of material to scent-containing gas, or any combination thereof.

The scent may be contained within a lacquer, or other liquid, before it is disposed upon the sheet of material 12. The scent may also be contained within a dye, ink, and/or pigment (not shown). Such dyes, inks and pigments are known in the art, and are commercially available, and may be disposed upon or incorporated in the sheet of material 12 by any method described herein or known in the art.

The sheet of material 12 comprises a pull tab 28 and pull indicia 30. The pull tab 28 permits at least one of the operator's fingers to be slipped under the pull tab 28 in order to grasp the pull tabs 28 and pull one portion of the sheet of material 12 away from at least one other portion of the sheet of material 12. The pull tab 28 may be located near any side, or multiple pull tabs may be located near one side or multiple sides of the sheet of material 12, as long as the pull tab 28 may be easily grasped and lifted away from the wrapped sheet of material 12, thereby causing the sheet of material 12 to unwrap from around itself and the floral arrangement 32, thereby gently releasing the floral arrangement from the wrapping material 10.

The pull tab 28 may form a portion of the sheet of material 12, or the pull tab 28 may form a die-cut extension of the sheet of material 12. Further, the pull tab 28 may comprise an integral portion of the sheet of material 12, or may form a small second separate sheet of material 12 which may be separately attached, either after the sheet of material 12 has been constructed (not shown), or after the sheet of material 12 has been wrapped about a floral arrangement 32 (not shown). Located at or near the pull tab 28 is pull indicia 30.

For example, FIG. 1 shows a pull tab with the word "Pull" printed in the corner of the sheet of material 12 indicating that removal of the sheet of material 12 from the floral arrangement 32 is to be initiated at that point. That is, the pull tab 28 is located in the area designated by the pull indicia 30, and the pull tab 28 may be grasped to initiate the removal of the sheet of material 12 from the floral arrangement 32.

The pull tab 28 and/or the pull indicia 30 may be located on any portion of the sheet of material 12 having a bonding material 42 thereon (FIG. 20), or, alternatively, may be located in an area without bonding material 42 (FIG. 1). When the pull tab 28 is located on bonding material 42, the bonding material at the location of the pull tab 28 has less "tack" or bonding, as previously described, than the remainder of the bonding material 42 disposed on the sheet of material 12.

The sheet of material 12 shown in FIGS. 1–2 shows the use of a pull tab 28 and pull indicia 30 near the corner junction of the first side 20 and the third side 24 of the sheet of material 12. The bonding material 42 does not extend into this junction, thereby forming a non-bonded area for the pull tab 28. Disposed on the pull tab 28 is pull indicia 30 comprising a square, with the word "Pull" printed in the square (the word "pull" appears backwards in FIG. 1, because when wrapped, the lower surface 16, as shown in FIG. 2, would be exposed, thus exposing the pull indicia 30 "Pull" correctly).

It will be appreciated that more than one pull tab area may be disposed upon the sheet of material. Further, more than one change in bonding characteristics that is, the bonding or "tack" of the bonding material, as described above, may be disposed upon the sheet of material (not shown).

Figure 3:
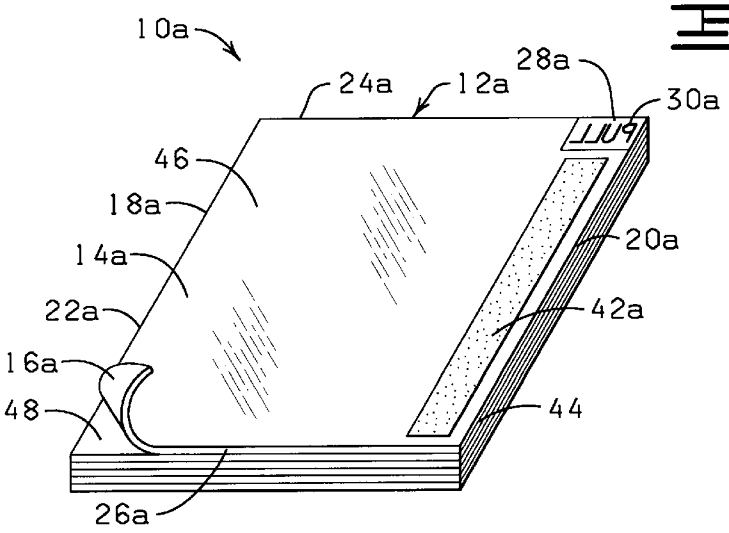
FIG. 3 is a perspective view of the wrapping material of FIG. 1, but showing a plurality of sheets of material comprising a pad.

The Embodiment of FIG. 3

Illustrated in FIG. 3 is a modified material 10*a* which is constructed exactly like the material 10 shown in FIGS. 1–2, and described in detail previously, except that the sheet of material 12*a* comprises a plurality of sheets of material 12*a* connected together to form a pad 44 of sheets of material 12*a*. The pad 44 comprises a plurality of sheets of material 12*a* stacked one on top of the other and positioned so that the periphery 18*a*, that is, the first sides 20*a*, the second sides 22*a*, the third sides 24*a*, and the fourth sides 26*a* of the sheets of material 12*a* in the pad 44 generally are aligned.

Referring to FIG. 3, the pad 44 further comprises a top sheet of material 46 and a next sheet of material 48 disposed thereunder, the other sheets of material 12*a* being disposed under the next sheet of material 48 in the pad 44 of the sheets of material 12*a*. Each sheet of material 12*a* in the pad 44 may have a bonding material 42*a* (not shown) disposed thereupon, near at least a portion of the periphery 18*a* of each sheet of material 12*a*, and each sheet of material 12*a* having a bonding material 42*a* thereon is bondingly connectable to a portion of another sheet of material 12*a* for cooperating to connect the sheets of material 12*a* into the pad 44.

The top sheet of material 46 is capable of being disconnected from the pad 44 of sheets of material 12*a*. When the top sheet of material 46 is disconnected, the next sheet of material 48 forms the new top sheet of material 46, and the sheet of material 12*a* lying under the new top sheet of material 46 forms a new next sheet of material 48.

A bonding material 42*a* is disposed on each sheet of material 12*a* in the pad 44 and bondingly and releasably connects each sheet of material 12*a* to one other sheet of material 12*a* in the pad 44 whereby one of the sheets of material 12*a* can be releasably disconnected from another sheet of material 12*a* by pulling the sheets of material 12*a* apart. Further, the bonding material 42*a* bondingly and releasably connects each sheet of material 12*a* to portions of itself.

Figure 5:
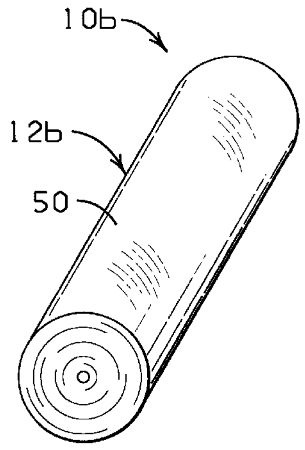
FIG. 5 is a perspective view of the wrapping material of FIG. 1, but showing a continuous roll of material comprising a plurality of sheets of material contained within a roll.
Figure 4:
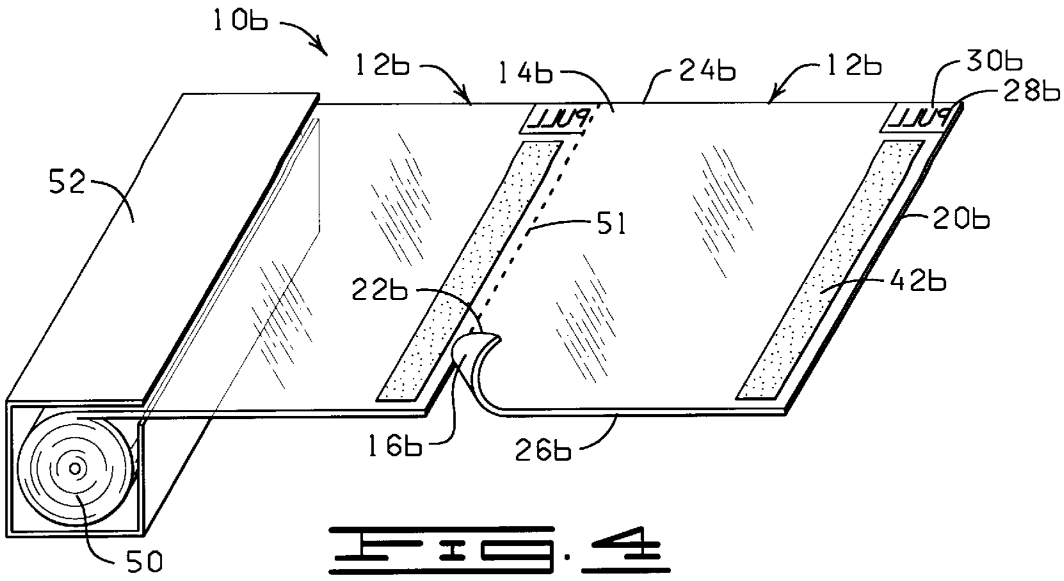
FIG. 4 is a perspective view of the wrapping material of FIG. 1, but showing a continuous roll of material comprising a plurality of sheets of material contained within a roll in a dispenser.

The Embodiment of FIGS. 4–5

Illustrated in FIGS. 4–5 is a modified material 10*b* which is constructed exactly like the material 10 shown in FIGS. 1–2 and described in detail previously except that the material 10*b* comprises a roll 50 of sheets of material 12*b* contained within a dispenser 52, as shown in FIG. 4. The roll 50 contains a material 10*b* comprising a plurality of sheets of material 12*b* in the roll 50, the sheets of material 12*b* being connected by perforations 50 to form the roll 50 (the sheet of material 12*b* shown partially detached and turned upward for illustration purposes only). Such a roll 50 may be provided without a dispenser 52 as well, as shown in FIG. 5. Such rolls 50 permit one sheet of material 12*b* to be withdrawn from the roll 50, and the sheet of material 12*b* is detached or severed from the roll 50. Alternatively, the roll 50 may simply be formed as a continuous roll 50 without perforations, and the wrapping material 10*b* may be withdrawn from the roll 50 and a portion may be severed into separate sheets of material 12*b* by serrated cutting edge (not shown) contained within the dispenser 52, or by a separate cutting element (not shown). Any number of sheets of material 12*b* may form the roll 50 as long as it is possible to withdraw at least one sheet of material 12*b* from the roll 50. It will be understood therefore that the roll 50 may comprise only one sheet of material 12*b*, without the dispenser 52 (not shown).

The Method Of Use of FIGS. 6–11

FIGS. 6–11 illustrate one method of use of the present invention. The wrapping material 10*a* and the sheet of material 12*a* illustrated in this embodiment and used in this method are constructed exactly the same as the wrapping material 10*a* and the sheet of material 12*a* in FIG. 3 and described in detail previously.

Figure 14:
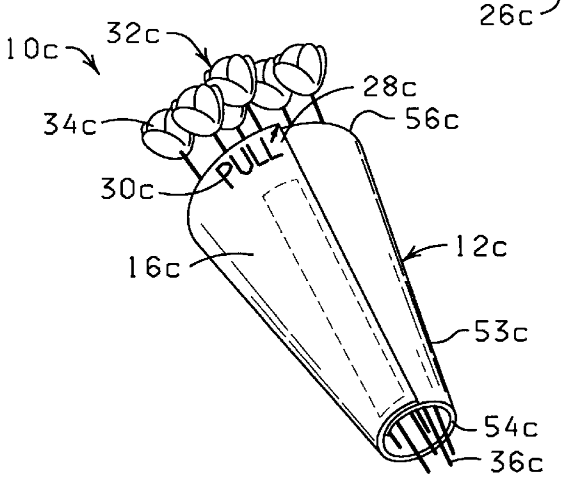
FIG. 14 is a perspective view of the wrapping material of FIG. 12, but showing a wrapped floral arrangement, the pull indicia being readily apparent.
Figure 15:
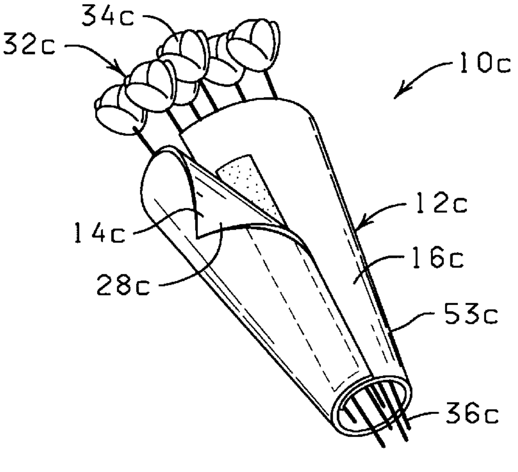
FIG. 15 is a perspective view of the wrapped floral arrangement of FIG. 14, but showing the floral arrangement partially unwrapped.
Figure 16:
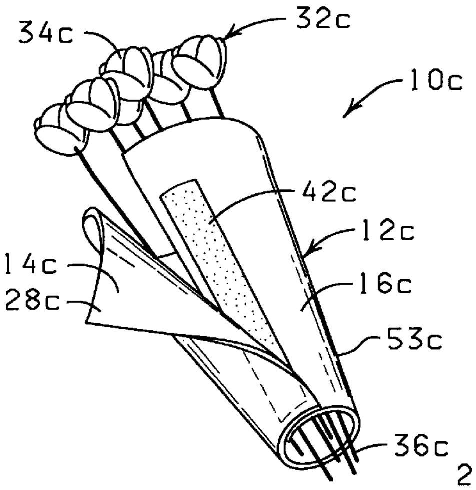
FIG. 16 is a perspective view of the wrapped floral arrangement of FIG. 14, the wrapping material unwrapping from around the floral arrangement.

In a general method of use, a floral arrangement 32 is placed on the top sheet of material 46, the sheet of material 12*a* being sized to wrap about and substantially surround and encompass the floral arrangement 32. The sheet of material 12*a* is wrapped about the floral arrangement 32, the sheet of material 12*a* simultaneously disconnecting from the pad 44 of sheets of material 12*a* as the sheet of material 12*a* is wrapped about the floral arrangement 32. A portion of the sheet of material 12*a*, such as the second side 22*a* of the sheet of material 12*a*, overlaps at least one other portion of the sheet of material 12*a*. The overlapping portions of the sheet of material 12*a* are bonded to the sheet of material 12*a* by their contact with the bonding material 42*a* on the upper surface 14*a* of the sheet of material 12*a* which bondingly contacts and engages the overlapped portions of the sheet of material 12*a*, whereby the second side 22*a* of the sheet of material 12*a* is bonded to overlapping portions of the sheet of material 12*a* generally between the third side 24*a* and the fourth side 26*a* of the sheet of material 12*a* whereby there are no loose flaps formed by unbonded portions of the sheet of material 12*a*. The sheet of material 12*a* substantially encompasses and surrounds a substantial portion of the flower portion 34 of the floral arrangement 32. The sheet of material 12*a* is held about the floral arrangement 32 by the bonding contact of the overlapping portions of the sheet of material 12*a*, the sheet of material 12*a* being tightly wrapped about the stem portion 36 of the floral arrangement 32. The sheet of material 12*a* wrapped about the floral arrangement 32 forms a cylindrically-shaped wrapping 53 (FIG. 9), or, alternatively, a conically-shaped wrapping 53*c* (FIG. 14), or, in further alternatives, may form any geometric, non-geometric, or asymmetrical shaped wrapping 70. Both shapes of wrapping 53 shown herein have an opening extending through a lower end 54 thereof and an opening extending through the upper end 56 thereof with the stem portion 36 of the floral arrangement 32 extending through the opening in the lower end 54 and the flower portion 34 of the floral arrangement 32 being exposed near the opening in the upper end 56 thereof, the upper end 56 of the wrapping 53 being loosely wrapped about the flower portion 34 of the floral arrangement 32.

Figure 7:
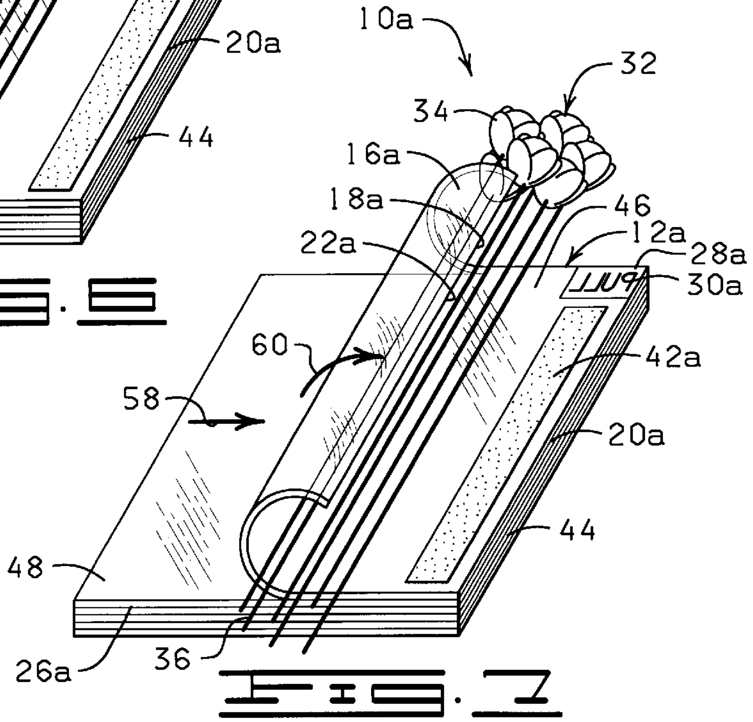
FIG. 7 is a perspective view of the wrapping material of FIG. 3, but showing a partially wrapped floral arrangement.

FIGS. 6–11 show one specific method of use. A plurality of sheets of material 12*a* in a pad 44, and a floral arrangement 32, as described above, are provided. The floral arrangement 32 is disposed on the top sheet of material 46 on the pad 44 of sheets of material 12*a*. An operator then lifts a portion of the top sheet 46 (generally the portion near the second side 22*a*) and places the lifted portion over a portion of the floral arrangement 32, as shown in FIG. 7. In this position, the top sheet of material 46 is rolled over the floral arrangement 32, and the top sheet of material 46 and the floral arrangement 32 are rolled in a general direction 58 (FIGS. 7–8) whereby the top sheet of material 46 and the floral arrangement 32 contained therein are lifted from the next sheet of material 48 (FIG. 9), the floral arrangement 32 being rolled into the top sheet of material 46, thereby rolling the top sheet of material 46 generally about the floral arrangement 32 and containing and substantially encompassing the floral arrangement 32 within the top sheet of material 46.

Figure 8:
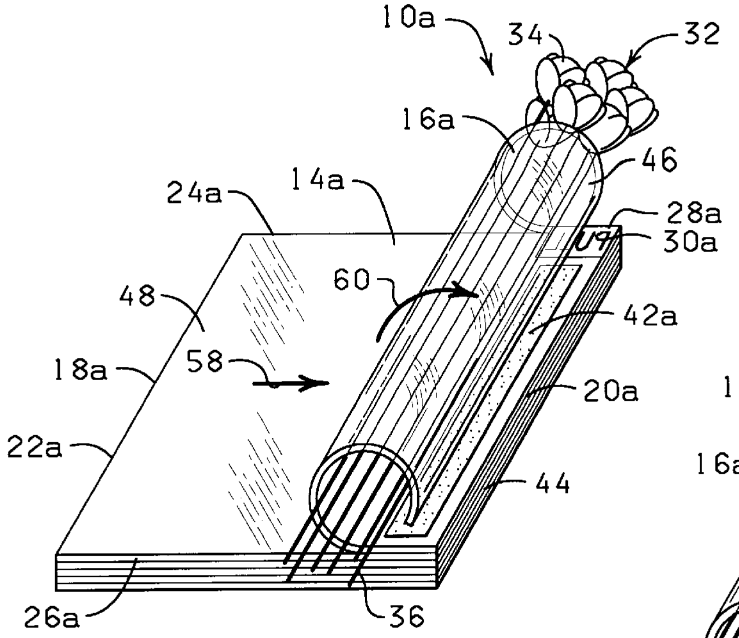
FIG. 8 is a perspective view of the wrapping material of FIG. 3, but showing a partially wrapped floral arrangement.
Figure 9:
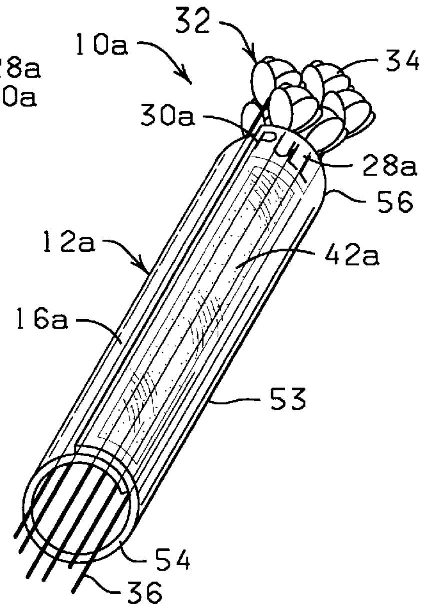
FIG. 9 is a perspective view of the wrapping material of FIG. 3, but showing a wrapped floral arrangement.

The top sheet of material 46 and the floral arrangement 32 contained therein are continued rolled in a rolling direction 60 and in the direction 58 generally toward the first side 20*a* of the top sheet of material 46 until the floral arrangement 32 is disposed generally adjacent the first side 20*a* of the top sheet of material 46, as shown in FIG. 8. In this position, the operator continues to roll the top sheet of material 46 and the floral arrangement 32 disposed thereon in the rolling direction 60 and in the general direction 58 thereby lifting the top sheet of material 46 from the next sheet of material 48 and releasing the top sheet of material 46 from the bonding material 42*a* disposed on the next sheet of material 48, the next sheet of material 48 generally beneath the top sheet of material 46 and simultaneously disconnecting the top sheet of material 46 from the bonding material 42*a* connection between the top sheet of material 46 and the next sheet of material 48. The adjacent upper surface 14*a* of the second side 22*a* of the top sheet of material 46 is then bondingly connected to the bonding material 42*a* on the upper surface 14*a* of the top sheet of material 46 near the first side 20*a*, thereby securely wrapping the floral arrangement 32, as shown in FIG. 9, the method of wrapping permitting the pull tab 28*a* and pull indicia 30*a* on the top sheet of material 46 to be readily visible on the wrapped floral arrangement 32.

When the top sheet of material 46 has been secured about the floral arrangement 32 in the manner just described, the next sheet of material 48, generally under the top sheet of material 46, then provides a new top sheet of material 46, the sheet of material 12*a* under the new top sheet of material 46 providing a new next sheet of material 48, and the process can be repeated for wrapping additional or other floral arrangements 32.

Such a method of wrapping is shown and described in detail in U.S. Pat. No. 5,181,364, entitled, "Wrapping a Floral Grouping With Sheets Having Adhesive Or Cohesive Material Applied Thereto," which issued Jan. 26, 1993. U.S. Pat. No. 5,181,364 is specifically incorporated by reference herein.

In the wrapped condition with the sheet of material 12 wrapped about the floral arrangement 32, the wrapped sheet of material 12 forms a "wrapping" or "wrapper" 53. Further, it will be understood that the terms "wrapping" and "wrapper" are used interchangeably herein. The wrapper 53, when formed, permits both the stem portion 36 of the floral arrangement 32 to extend through the opening in the lower end 54 of the wrapper 53 and the bloom portion 34 of the floral arrangement to extend through the opening in the upper end 56 of the wrapper 53.

Figure 10:
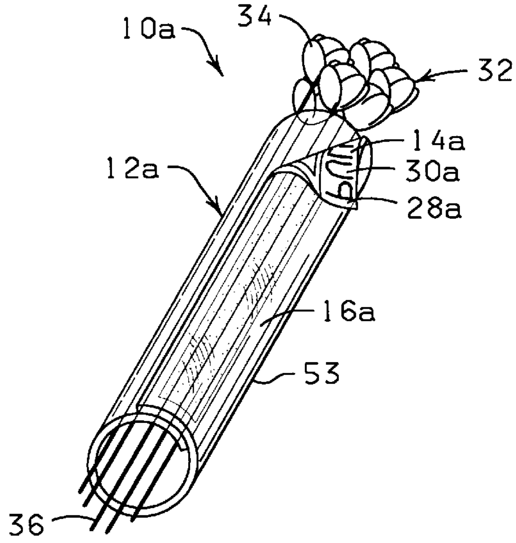
FIG. 10 is a perspective view of the wrapped floral arrangement of FIG. 9, but showing the floral arrangement partially unwrapped.
Figure 11:
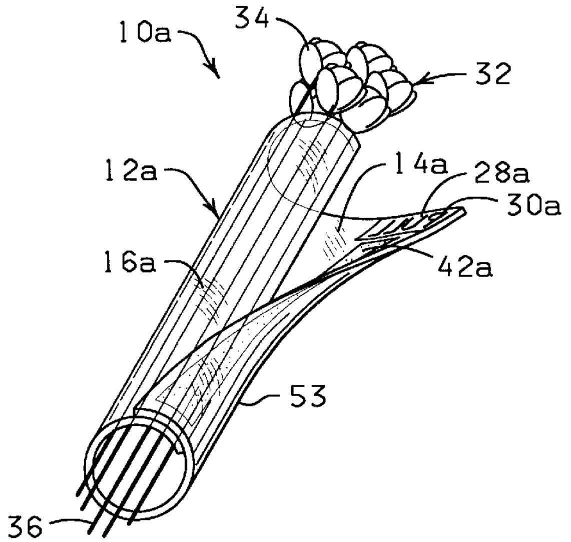
FIG. 11 is a perspective view of the wrapped floral arrangement of FIG. 9, but showing the wrapping material unwrapping from around the floral arrangement.
Figure 12:
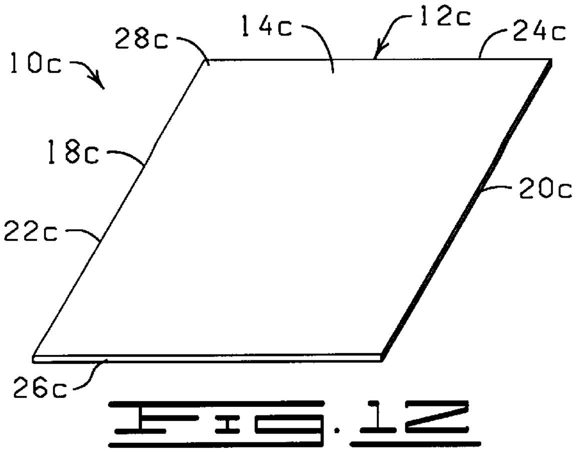
FIG. 12 is a perspective view of a modified wrapping material constructed exactly like the wrapping material of FIGS. 1 and 2, but showing a non-transparent wrapping material with no pull indicia on an upper surface of the sheet of material.
Figure 13:
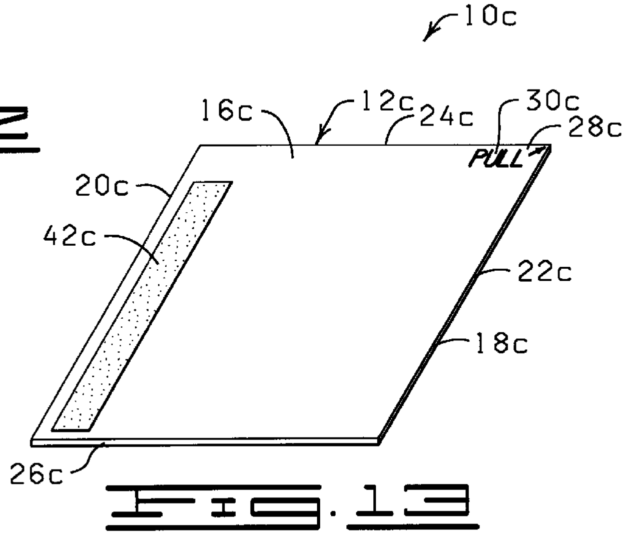
FIG. 13 is a perspective view of the wrapping material of FIG. 12, but showing the pull indicia disposed on a lower surface of the sheet of material.

FIGS. 10 and 11 show a method of removing the sheet of material 12*a* from the wrapped floral arrangement 32. The pull tab 28*a* and pull indicia 30*a* are located in a position on the wrapped sheet of material 12*a* which is easily visible to the operator. The operator grasps the pull tab 28*a* between his fingers (or between his thumb and at least one finger, by placing at least one finger on one surface of the pull tab 28*a* and at least one other finger on one other surface of the pull tab 28*a*), and pulls the portion of the sheet of material 12*a* surrounding the pull tab 28*a* away from the underlying portion of the sheet of material 12*a* that it overlapped and was bonded to. The bonding material 42*a* readily releases the portion of the sheet of material 12*a* surrounding the pull tab 28*a* from the underlying portion of the sheet of material 12*a* lying directly thereunder, thus permitting quick and easy removal of the sheet of material 12*a* from the floral arrangement 32, said removal being accomplished without causing damage to the delicate floral arrangement 32.

The Embodiment And Method Of Use Of FIGS. 12–16

FIGS. 12–16 illustrate another embodiment and method of use of the present invention. The wrapping material 10*c* and sheet of material 12*c* illustrated in this embodiment and used in this method are constructed exactly the same as the wrapping material 10 and the sheet of material 12 shown in FIGS. 1–2 and described in detail previously, except that the sheet of material 12*c* is not transparent, the pull indicia 30*c* comprises both the word "Pull" and an arrow symbol pointing to the corner junction of the first side 20*c* and the third side 24*c* of the sheet of material 12*c*, and the pull indicia 30*c* is printed on the lower surface 16*c* of the sheet of material 12*c*.

A floral arrangement 32*c* is disposed upon the sheet of material 12*c*, in the same manner shown in FIGS. 6–11 and described in detail previously for the method of use of wrapping material 10*a* and the sheet of material 12*a*, except that a single sheet of material 12*c* is utilized, and the wrapping material 10*c* forms generally a conical-shaped wrapper 53*c*. The sheet of material 12*c* is unwrapped from the floral arrangement 32*c* in exactly the same manner as shown herein and described in detail previously.

Figure 17:
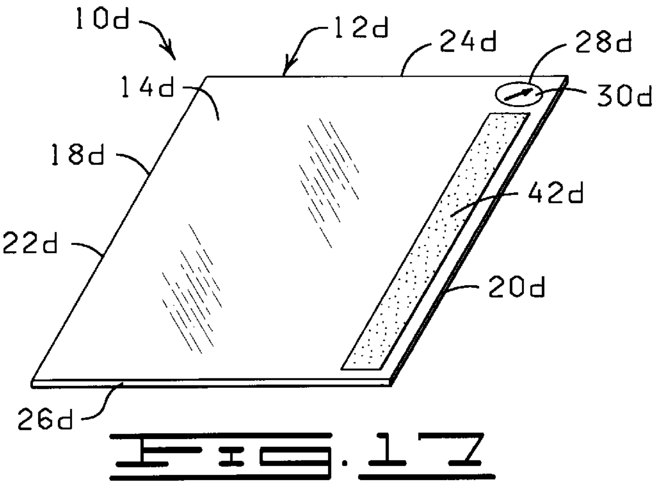
FIG. 17 is a perspective view of a modified wrapping material constructed exactly like the wrapping material of FIGS. 1 and 2, but showing pull indicia as symbols.

The Embodiment and Method of Use of FIG. 17

FIG. 17 illustrates another embodiment of the present invention. The wrapping material 10*d* and sheet of material 12*d* illustrated in this embodiment and used in this method are constructed exactly the same as the wrapping material 10 and the sheet of material 12 shown in FIGS. 1–2 and described in detail previously, except that the sheet of material 12*d* has a pull indicia 30*d* of a circle with an arrow pointing to the corner junction of the first side 20*d* and the third side 24*d* of the sheet of material 12*d*.

A floral arrangement 32*d* (not shown) is disposed upon the sheet of material 12*d* in the same manner shown in FIGS. 6–11 and described in detail previously for the method of use of wrapping material 10*a* and the sheet of material 12*a*; however, it will be appreciated that any method of use shown or described herein may be utilized. The sheet of material 12*d* is unwrapped from a floral arrangement 32*d* (not shown) in exactly the same manner as shown herein and described in detail previously.

Figure 18:
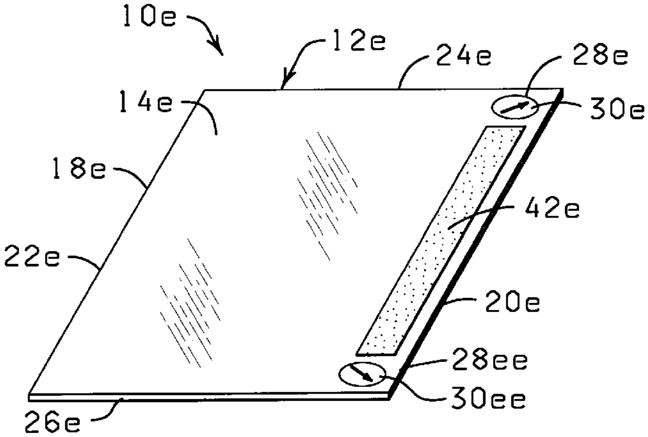
FIG. 18 is a perspective view of a modified wrapping material constructed exactly like the wrapping material of FIGS. 1 and 2, but showing a first pull tab and a second pull tab and corresponding first pull indicia and second pull indicia disposed thereon, the pull indicia represented as symbols.

The Embodiment and Method of Use of FIG. 18

FIG. 18 illustrates another embodiment of the present invention. The wrapping material 10*e* and sheet of material 12*e* illustrated in this embodiment and used in this method are constructed exactly the same as the wrapping material 10 and the sheet of material 12 shown in FIGS. 1–2 and described in detail previously, except that the sheet of material 12*e* has a first pull tab 28*e* and a second pull tab

28*ee*, a first pull indicia 30*e* and a second pull indicia 30*ee,* the first pull indicia 30*e* being disposed near the first pull tab 28*e*, and the second pull indicia 30*ee* being disposed near the second pull tab 28*ee*, the first pull tab 28*e* and pull indicia 30*e* being located near the corner junction of the first side 20*e* and the third side 24*e* of the sheet of material 12*e*, the second pull tab 28*ee* and pull indicia 30*ee* being located near the corner junction of the first side 20*e* and the fourth side 26*e*, the first pull indicia 30*e* comprising a circle with an arrow pointing to the corner junction of the first side 20*e* and the third side 24*e* of the sheet of material 12*e*, the second pull indicia 30*ee* comprising a circle with an arrow pointing to the corner junction of the first side 20*e* and the fourth side 26*e* of the sheet of material 12*e*.

A floral arrangement 32*e* (not shown) is disposed upon the sheet of material 12*e* in the same manner shown in FIGS. 6–11 and described in detail previously for the method of use of wrapping material 10*a* and the sheet of material 12*a*; however, it will be appreciated that any method of use shown or described herein may be utilized. The sheet of material 12*e* is unwrapped from a floral arrangement 32*e* (not shown) in exactly the same manner as shown herein and described in detail previously, except that either the first pull tab 28*e* may be used to unwrap the floral arrangement 32*e*, or the second pull tab 28*ee* may be used, or both the first pull tab 28*e* and the second pull tab 28*ee* may be utilized to remove the sheet of material 12*e* from the floral arrangement 32*e*, in either a concurrent or sequential manner.

Figure 19:
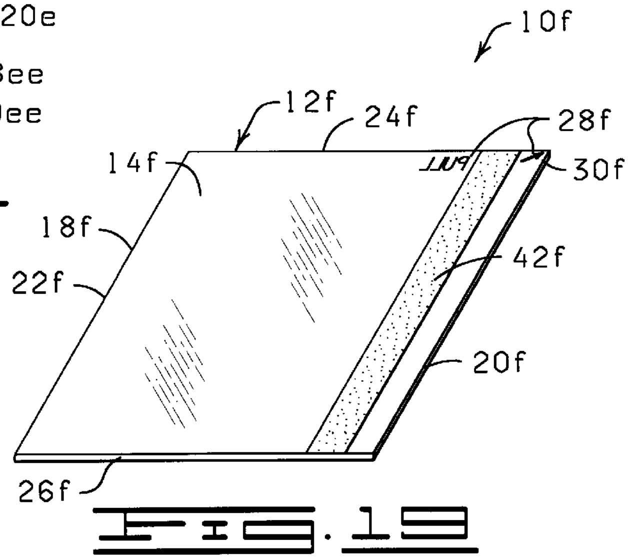
FIG. 19 is a perspective view of a modified wrapping material constructed exactly like the wrapping material of FIGS. 1 and 2, but showing a bonding material extending substantially along the length of one side of the sheet of material, pull indicia being located to either side of the bonding material.

The Embodiment and Method of Use of FIG. 19

FIG. 19 illustrates another embodiment of the present invention. The wrapping material 10*f* and sheet of material 12*f* illustrated in this embodiment and used in this method are constructed exactly the same as the wrapping material 10 and the sheet of material 12 shown in FIGS. 1–2 and described in detail previously, except that the sheet of material 12*f* has a bonding material 42*f* strip which extends near the entire length of the first side 20*f*, that is, from the third side 24*f* to the fourth side 26*f*, the pull tab 28*f* and pull indicia 30*f* being disposed on either side of the bonding material 42*f* strip and near the third side 24*f*, with the pull indicia 30*f* “Pull” on one side of the bonding material 42*f*, and the pull indicia 30*f* symbol of an arrow disposed on the other side of the bonding material 42*f*, that is, near to and pointing to the corner junction of the first side 20*f* and the third side 24*f* of the sheet of material 12*f*.

A floral arrangement 32*f* (not shown) is disposed upon the sheet of material 12*f* in the same manner shown in FIGS. 6–11 and described in detail previously for the method of use of wrapping material 10*a* and the sheet of material 12*a*; however, it will be appreciated that any method of use shown or described herein may be utilized. The sheet of material 12*f* is unwrapped from a floral arrangement 32*f* (not shown) in exactly the same manner as shown herein and described in detail previously.

Figure 20:
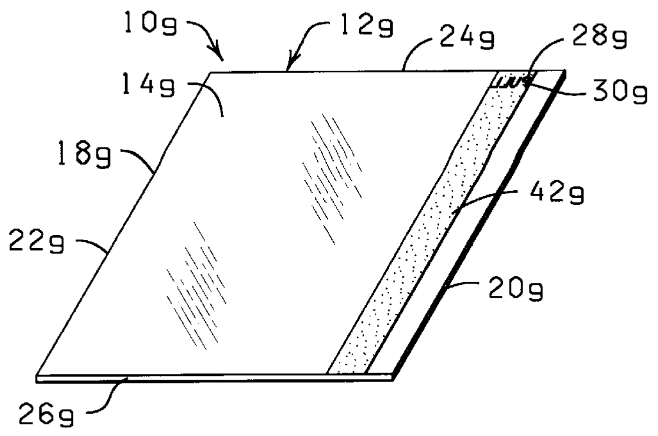
FIG. 20 is a perspective view of a modified wrapping material constructed exactly like the wrapping material of FIGS. 1 and 2, but showing bonding material extending substantially along the length of one side of the sheet of material, a pull tab and pull indicia being located at an upper end of the bonding material, the bonding material having less bonding at the site of the pull tab and pull indicia.

The Embodiment and Method of Use of FIG. 20

FIG. 20 illustrates another embodiment of the present invention. The wrapping material 10*g* and sheet of material 12*g* illustrated in this embodiment and used in this method are constructed exactly the same as the wrapping material 10 and the sheet of material 12 shown in FIGS. 1–2 and described in detail previously, except that the sheet of material 12*g* has a bonding material 42*g* strip which extends the entire length of the sheet of material 12*g* near the first side 20*g*, from the third side 24*g* to the fourth side 26*g*, the pull tab 28*g* and pull indicia 30*g* being near the end of the bonding material 42*g* strip, that is, near the third side 24*g* of the sheet of material 12*g* and near the corner junction of the first side 20*g* and the third side 24*g* of the sheet of material 12*g*, the bonding characteristics or “tack” of the bonding material 42*g* being decreased, as described previously, at the site of the pull tab 28*g* and pull indicia 30*g* to enhance an operator’s ability to grasp the pull tab 28*g* and remove the sheet of material 12*g* from a floral arrangement 32*g*.

A floral arrangement 32*g* (not shown) is disposed upon the sheet of material 12*g* in the same manner shown in FIGS. 6–11 and described in detail previously for the method of use of wrapping material 10*a* and the sheet of material 12*a*; however, it will be appreciated that any method of use shown or described herein may be utilized. The sheet of material 12*g* is unwrapped from a floral arrangement 32*g* (not shown) in exactly the same manner as shown herein and described in detail previously, except that, in a further alternative, the sheet of material 12*g* may be removed from the floral arrangement 32*g* by the operator first inserting a finger (or fingers) under the pull tab 28*g* on the outer wrapped layer of the sheet of material 12*g* at the point indicated by the pull indicia 30*g* to grasp the pull tab 28*g* for removal of the sheet of material 12*g*.

Figure 21:
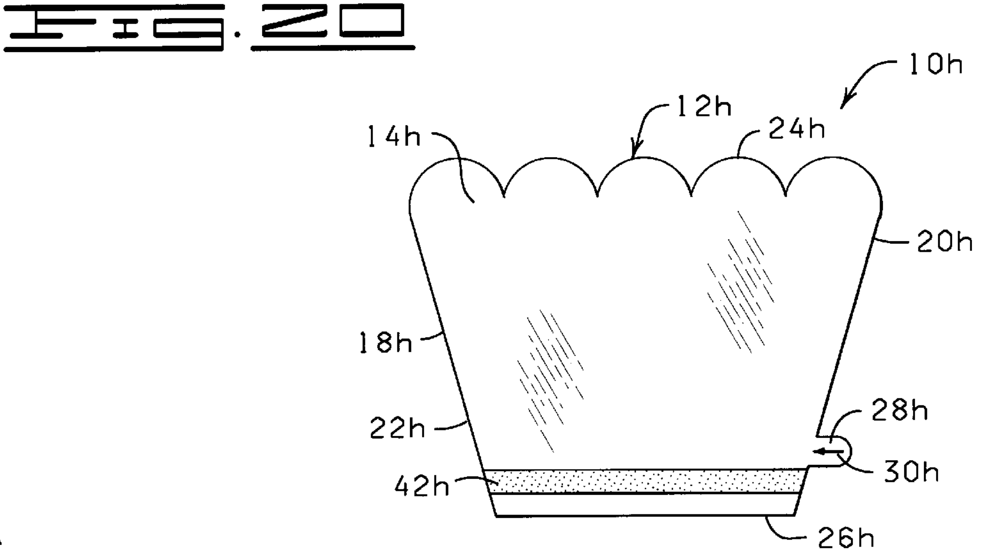
FIG. 21 is a perspective view of a modified wrapping material constructed exactly like the wrapping material of FIGS. 1 and 2, but showing the sheet of material as a trapezoidal shape, one side having a scalloped design, bonding material extending along a lower side of the sheet of material, a pull tab being disposed on an adjoining side of the sheet of material comprising an extension of the sheet of material, the pull indicia being represented as a symbol disposed on the pull tab.
Figure 22:
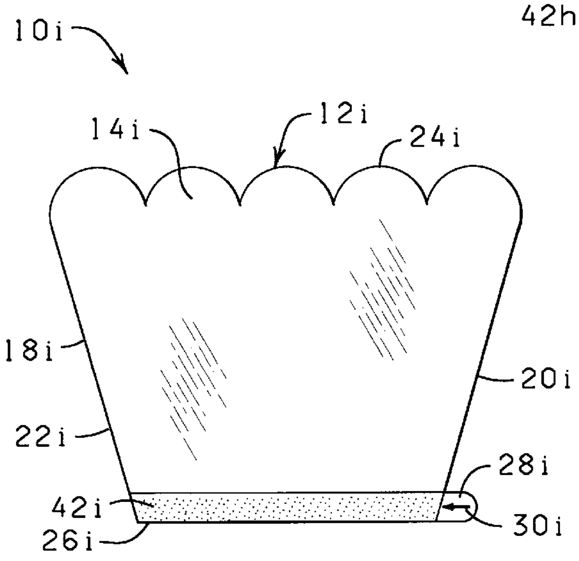
FIG. 22 is a perspective view of a modified wrapping material constructed exactly like the wrapping material of FIG. 21, but showing a pull tab and pull indicia thereon as an extension located at the same level as a bonding material.

The Embodiment and Method of Use of FIG. 21

FIG. 21 illustrates still another embodiment of the present invention. The wrapping material 10*h* and sheet of material 12*h* illustrated in this embodiment and used in this method are constructed exactly the same as the wrapping material 10 and the sheet of material 12 shown in FIGS. 1–2 and described in detail previously, except that the sheet of material 12*h* is die-cut into a trapezoidal shape and has a scalloped design cut into the third side 24*h* of the sheet of material 12*h*, the bonding material 42*h* is a strip of bonding material 42*h* which is disposed generally between the first side 20*h* and the second side 22*h* of the sheet of material 12*h*, the bonding material 42*h* disposed near the fourth side 26*h*, and the pull tab 28*h* has been die-cut as an extension of the sheet of material 12*h*, and the pull tab 28*h* has pull indicia 30*h* represented as an arrow thereon. The pull tab 28*h* is situated slightly above the bonding material 42*h*, on the first side of the sheet of material 12*h* and near the corner junction of the first side 20*h* and the fourth side 26*h* of the sheet of material 12*h*.

A floral arrangement 32*h* (not shown) is disposed upon the sheet of material 12*h* in the same manner shown in FIGS. 6–11 and described in detail previously for the method of use of wrapping material 10*a* and the sheet of material 12*a*, however, it will be appreciated that any method of use shown or described herein may be utilized. The sheet of material 12*h* is unwrapped from a floral arrangement 32*h* in exactly the same manner as shown herein and described in detail previously.

The Embodiment and Method of Use of FIGS. 22–25

FIGS. 22–25 illustrate still another embodiment of the present invention and method of use of the present invention. The wrapping material 10*i* and sheet of material 12*i* illustrated in this embodiment and used in this method are constructed exactly the same as the wrapping material 10*h* and the sheet of material 12*h* shown in FIG. 21 (wrapping material 10*h* and sheet of material 12*h* being exactly like FIGS. 1–2 and described in detail previously, except for the differences described above) except that, as shown in FIG.

22, the pull tab 28*i* is die-cut adjacent the bonding material strip 42*i*, the pull tab 28*i* being located on the first side 20*i* of the sheet of material 12*i* and in the corner junction of the first side 20*i* and the fourth side 26*i* of the sheet of material 12*i*.

Figure 23:
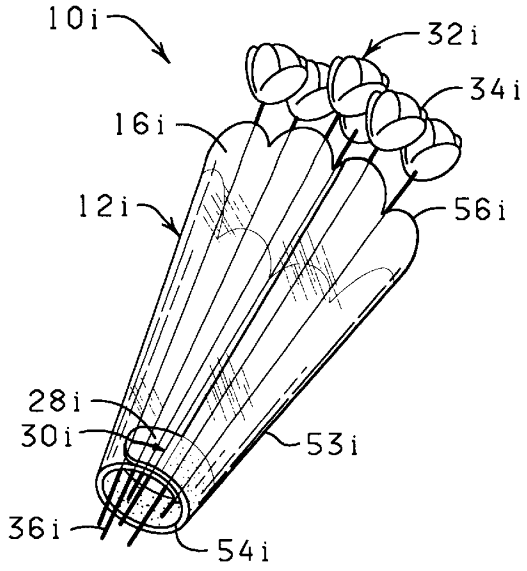
FIG. 23 is a perspective view of the wrapping material of FIG. 22, showing a wrapped floral arrangement.
Figure 24:
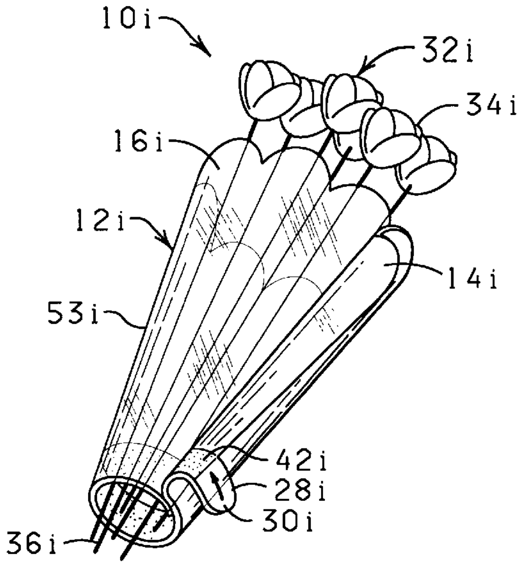
FIG. 24 is a perspective view of the wrapped floral arrangement of FIG. 23, but showing the floral arrangement partially unwrapped.
Figure 25:
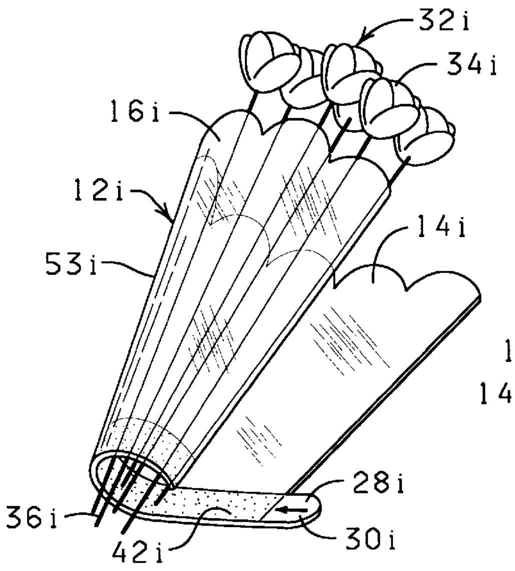
FIG. 25 is a perspective view of the wrapped floral arrangement of FIG. 23, but showing the wrapping material unwrapping from around the floral arrangement.
Figure 26:
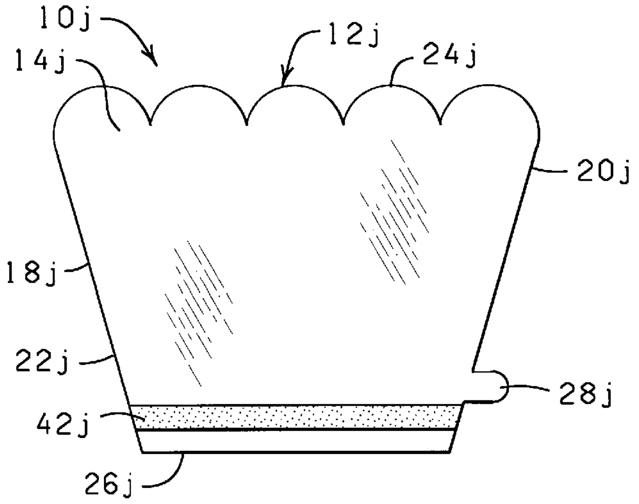
FIG. 26 is a perspective view of a wrapping material constructed exactly like the wrapping material of FIG. 21.

A floral arrangement 32*i* is disposed upon the sheet of material 12*i* in the same manner shown in FIGS. 6–11 and described in detail previously for the method of use of wrapping material 10*a* and the sheet of material 12*a*, however, it will be appreciated that any method of use shown or described herein may be utilized (FIG. 23). The sheet of material 12*i* is unwrapped from a floral arrangement 32*i* in exactly the same manner as shown herein and described in detail previously, as shown in FIGS. 24–25.

The Embodiment and Method of Use of FIGS. 26–29

FIGS. 26–29 illustrate still another embodiment of the present invention and method of use of the present invention. The wrapping material 10*j* and sheet of material 12*j* illustrated in this embodiment and used in this method are constructed exactly the same as the wrapping material 10*h* and the sheet of material 12*h* shown in FIG. 21 (wrapping material 10*h* and sheet of material 12*h* being exactly like FIGS. 1–2 and described in detail previously, except for the differences described above).

Figure 28:
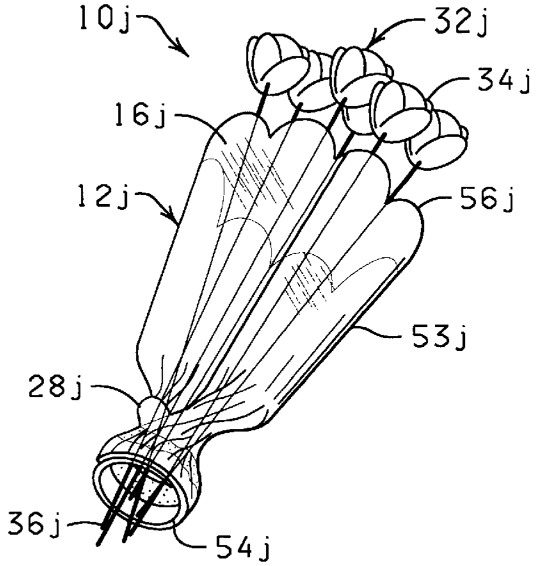
FIG. 28 is a perspective view of the wrapped floral arrangement, but showing the wrapper crimped near the stem end of the floral arrangement, the crimped end being twisted about the stem end by being rotated clockwise one-quarter turn.

A floral arrangement 32*j* is disposed upon the sheet of material 12*j* in the same manner shown in FIGS. 6–11 and described in detail previously for the method of use of wrapping material 10*a* and the sheet of material 12*a*; however, it will be appreciated that any method of use shown or described herein may be utilized. The method for wrapping the floral arrangement 32*j* with the sheet of material 12*j* differs somewhat from the previously described methods, in that the sheet of material 12*j* is crimped about the stem portion 36*j* of the floral arrangement 32*j* near the fourth side 26*j* of the sheet of material 12*j*, that is, in and around the area where the bonding material 42*j* is disposed. The crimping may be conducted as the floral arrangement 32*j* is wrapped (not shown), or the crimping may be conducted after the floral arrangement 32*j* is wrapped by crimping the sheet of material 12*j* in the area of the strip of bonding material 42*j*. Such crimping may be conducted by hand, by grasping and substantially encompassing with one or more hands the lower end of the wrapper 53*j* near the fourth side 26*j* of the sheet of material 12*j*, in the area of the strip of bonding material 42*j*, and evenly and firmly squeezing the sheet of material 12*j* about the area of the strip of strip of bonding material 42*j*, near the fourth side 26*j* of the sheet of material 12*j*, thereby pressing and gathering both the sheet of material 12*j* near the fourth end 26*j* against itself and against the stem portion 36*j* of the floral arrangement 32*j* and the bonding material 42*j* against itself and against the stem portion 36*j* of the floral arrangement 32*j*. The wrapper 53*j* may also be crimped by using both a crimping motion and a turning motion to create a twisted crimping, as illustrated in FIG. 28, resulting in a wrapper 53*j* which is both crimped, as described previously, and which is twisted about the stem portion 36*j* (the sheet of material 12*j* near the stem portion 36*j* being rotated between about one-eighth of a turn to about a full turn) primarily in the area near the stem portion 36*j* of the floral arrangement 32*j*. Such crimping as described above may also be conducted by any instrument or machine used for gathering or crimping packaging materials.

Figure 27:
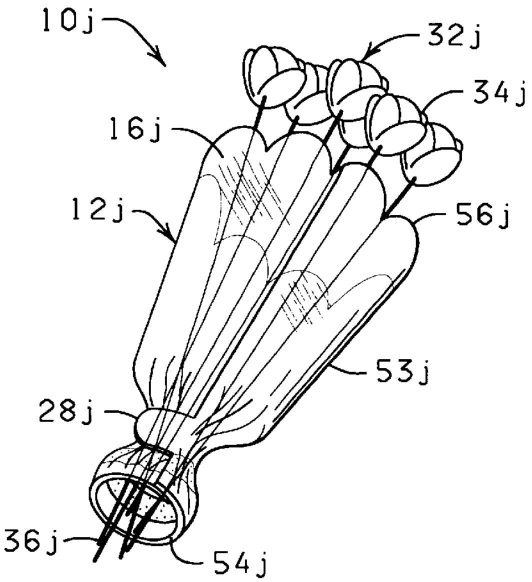
FIG. 27 is a perspective view of the wrapping material of FIG. 26 showing a wrapped floral arrangement, but showing the wrapper crimped near the stem end of the floral arrangement.

The pull tab 28*j* may extend over the crimped area, as shown in FIG. 27 to permit easy removal of the sheet of material 12*j*. Alternatively, the pull tab 28*j* may be at least partially tucked into the wrapper by folding the pull tab 28*j* toward the inside of the wrapper 53*j* (not shown) after the floral arrangement 32*j* has been wrapped and formed into a wrapper.

Figure 29:
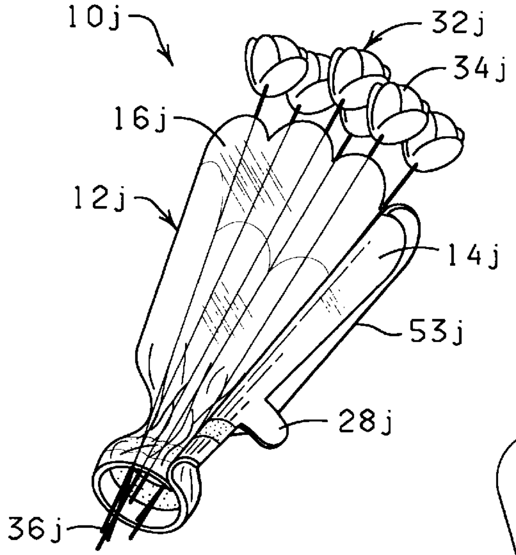
FIG. 29 is a perspective view of the wrapped floral arrangement of FIG. 27, but showing the wrapping material unwrapping from around the floral arrangement.

The sheet of material 12*j* is unwrapped from a floral arrangement 32*j*, as shown in FIG. 29, in exactly the same manner as shown herein and described in detail previously.

Figure 30:
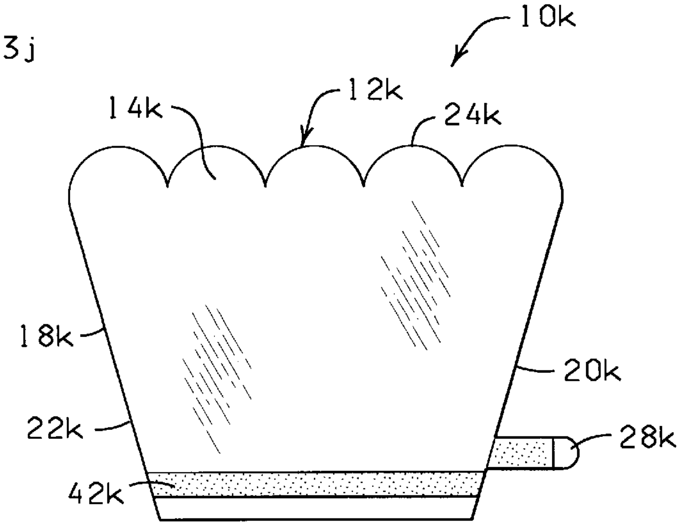
FIG. 30 is a perspective view of a wrapping material constructed exactly like the wrapping material of FIG. 26, but showing the elongation of the pull tab, the pull tab having a bonding material at partially disposed thereon.
Figure 31:
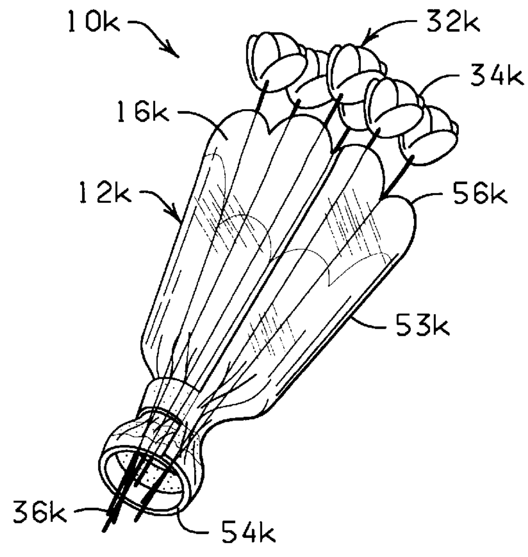
FIG. 31 is a perspective view of the wrapping material of FIG. 30 showing a wrapped floral arrangement, but showing the wrapper crimped near the stem end of the floral arrangement, and showing the pull tab acting to both crimp the wrapping material and retaining the wrapping material in the crimped condition.
Figure 32:
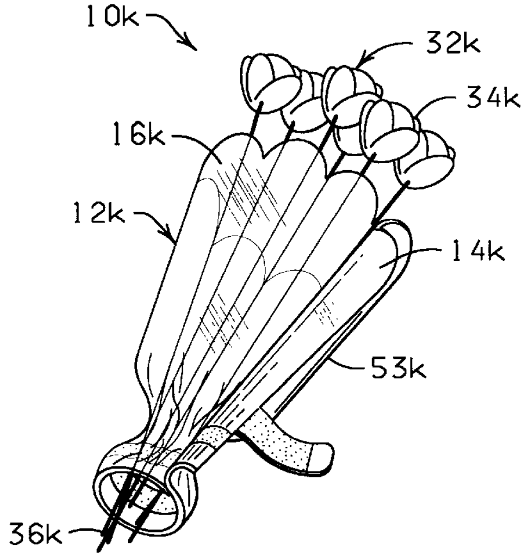
FIG. 32 is a perspective view of the wrapped floral arrangement of FIG. 31, but showing the wrapping material unwrapping from around the floral arrangement.

The Embodiment and Method of Use of FIGS. 30–32

FIGS. 30–32 illustrate still another embodiment of the present invention and method of use of the present invention. The wrapping material 10*k* and sheet of material 12*k* illustrated in this embodiment and used in this method are constructed exactly the same as the wrapping material 10*h* and the sheet of material 12*h* shown in FIG. 21 (wrapping material 10*h* and sheet of material 12*h* being exactly like FIGS. 1–2 and described in detail previously, except for the differences described above).

A floral arrangement 32*k* is disposed upon the sheet of material 12*k* in the same manner shown in FIGS. 6–11 and described in detail previously for the method of use of wrapping material 10*a* and the sheet of material 12*a*; however, it will be appreciated that any method of use shown or described herein may be utilized. The method for wrapping the floral arrangement 32*k* with the sheet of material 12*k*, as shown in FIGS. 31 and 32, differs somewhat from the previously described methods, in that the sheet of material 12*k* is crimped in a manner described in detail and shown previously in FIGS. 26–29, the only difference being that the pull tab 28*k* has a bonding material 42*k* at least partially disposed thereon, and the pull tab 28*k* is wrapped about the crimped portion of the wrapper 53*k* after the sheet of material 12*k* has been crimped, thereby further crimping the sheet of material 12*k* and restricting and retaining the sheet of material 12*k* in a crimped condition.

The wrapper 53*k* is caused to be more tightly wrapped about the floral arrangement 32*k* by grasping the pull tab 28*k* and pulling the pull tab 28*k* in a direction (not shown) about the lower end of the wrapper 53*k*. Once the pull tab 28*k* has been wrapped tightly about lower end of the wrapper 53*k*, the portion of the pull tab 28*k* having the bonding material 42*k* applied thereto is engagingly pressed against the wrapper 70*k* to affix the pull tab 28*k* to the wrapper 53*k* thereby causing the lower end of the wrapper 53*k* to be crimpingly wrapped about the stem portion 36*k* of the floral arrangement 32*k* for inhibiting the floral arrangement 32*k* from slipping or moving within the wrapper 53*k*.

In an alternative method (not shown), the pull tab 28*k* is elongated, and may have only a single spot of bonding material 42*k* thereon, and wraps completely around the wrapper 53*k*, the spot of bonding material 42*k* used to attach the pull tab 28*k* to itself after it is wrapped completely around the wrapper 53*k*. The pull tab 28*k* may be wrapped about the already crimped wrapper 53*k*, or, alternatively, the pull tab 28*k* may be utilized to both crimp the wrapper 53*k* in a crimped condition, as described above, as well as retain the wrapper 53*k* in a crimped condition.

In a further alternative method (not shown), the sheet of material 12*k* may have a bonding material 42*k* on the lower surface 16*k*, and the pull tab 28*k* may have no bonding material 42*k* thereon. The sheet of material 12*k* will then be crimped by any method previously described herein, and the pull tab 28*k* will extend about the crimped bonding material and will bond thereto, thereby retaining the wrapper 53*k* in a crimped condition.

The sheet of material 12*k* is unwrapped from a floral arrangement 32*k* in exactly the same manner as shown herein and described in detail previously.

The Embodiment and Method of Use of FIGS. 33–40

Figure 33:
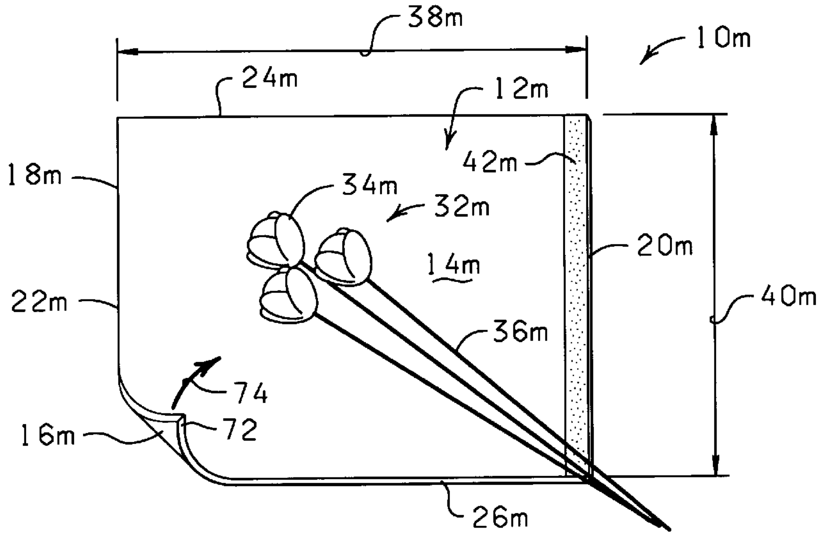
FIG. 33 is a plan view of a sheet of material of the present invention showing a floral arrangement disposed thereon.

Referring now to FIG. 33, designated by the reference numeral 10*m* is a sheet of wrapping material constructed in accordance with the present invention. The wrapping material 10*m* comprises at least one sheet of material 12*m* having an upper surface 14*m*, a lower surface 16*m* (one edge of the sheet of material 12*m* being lifted for illustrative purposes only), and an outer periphery 18*m*. The outer periphery 18*m* of the sheet of material 12*m* further comprises a first side 20*m*, a second side 22*m*, a third side 24*m* and a fourth side 26*m*.

The sheet of material 12*m* is further characterized as having a width 38*m* (FIG. 33) extending generally between the first side 20*m* and the second side 22*m*, respectively. The sheet of material 12*m* is provided with a sufficient width 38*m* so that the sheet of material 12*m* can be wrapped about and substantially surround and encompass the floral arrangement 32*m*. The sheet of material 12*m* also has a length 40*m* (FIG. 33) which extends generally between the third side 24*m* and the fourth side 26*m*, respectively. The sheet of material 12*m* is provided with a sufficient length 40*m* so that the sheet of material 12*m* extends over a substantial portion of the floral arrangement 32*m* when the sheet of material 12*m* has been wrapped about the floral arrangement 32*m* in accordance with the present invention shown and described in detail herein.

The sheet of material 12*m* can be constructed from any suitable material that is capable of being wrapped about the floral arrangement 32*m*. Preferably, the sheet of material 12*m* comprises paper (untreated or treated in any manner), cellophane, foil, polymer film, fiber (woven or non-woven or synthetic or natural), cloth (woven or non-woven or natural or synthetic), burlap or any combination thereof.

The sheet of material 12*m* may vary in color. Further, the sheet of material 12*m* may consist of designs or other decorative surface ornamentations which are printed, etched and/or embossed; in addition, the sheet of material 12*m* may have various colorings, coatings, flockings and/or metallic finishes, or be characterized totally or partially by pearlescence, translucence, transparence, iridescence, or the like characteristics. Each of the above-named characteristics may occur alone or in combination. Moreover, each surface of the sheet of material 12*m* may vary in the combination of such characteristics.

The sheet of material 12*m* may further comprise an ink, dye, and/or pigment (not shown). Such inks, dyes and pigments are known in the art, and are commercially available, and may be disposed on or incorporated in the sheet of material 12*m* by any method described herein or known in the art. For example, the ink, dye or pigment may form a portion of a design or decoration on the sheet of material 12*m*, such as flowers, leaves and the like.

The thickness of the sheet of material 12*m* can vary widely and a sheet of material 12*m* of any thickness may be utilized in accordance with the present invention as long as the sheet of material 12*m* is wrappable about the floral arrangement 32*m*, as described herein. Generally, however, the sheet of material 12*m* will have a thickness in the range of from about 0.1 mils to about 30 mils, preferably from about 0.2 mils to about 10 mils, and more preferably from about 0.5 mils to about 2.5 mils.

In the embodiment of FIG. 33, the sheet of material 12*m* is rectangular. It will be appreciated, however, that the sheet of material 12*m* may be of any shape and size as long as the sheet of material 12*m* is sufficiently sized and shaped to wrap and encompass the floral arrangement 32*m* in accordance with the present invention. That is, the sheet of material 12*m* may be rectangular, circular, or any other geometric or non-geometric shape.

The sheet of material 12*m* may be constructed of a single sheet of material 12*m* or a plurality of sheets of the same or different materials. When multiple sheets of material are used, they may be the multiple sheets which may be connected together or laminated, or such sheets may comprise separate layers. Finally, it will be appreciated that the sheet of material 12*m* shown in FIG. 33 is substantially flat.

A decorative pattern, such as a color and/or an embossed pattern, and/or other decorative surface ornamentation may be applied to the upper and/or lower surface 14*m* and 16*m* of the sheet of material 12*m* or portions thereof including, but not limited to, printed designs, coatings, colors, flocking, or metallic finishes. The sheet of material 12*m* may also be totally or partially clear or tinted transparent material.

The floral arrangement 32*m* comprises the flower portion 34*m* which may comprise either a bloom or a foliage portion, and the stem portion 36*m*. As previously stated, the floral arrangement 32*m* may consist only of a single bloom or foliage (not shown) or a plurality of blooms and stems substantially as shown.

The sheet of material 12*m* also comprises a bonding material 42*m*. The bonding material 42*m* is disposed on the upper surface 14*m* of the sheet of material 12*m* so as to be disposed near the first side 20*m* thereof and extend substantially along the first side 20*m* between the third and fourth sides 24*m* and 26*m*, respectively, of the sheet of material 12*m*. The bonding material 42*m* is preferably a pressure sensitive adhesive and may comprise varying bonding characteristics so that the bonding material 42*m* may have less bonding characteristics or tack near the third and fourth sides 24*m* and 26*m*, respectively, of the sheet of material 12*m* so as to enhance removal of the sheet of material 12*m* when same has been wrapped about the floral arrangement 32*m* to provide a decorative covering therefor.

Further, the bonding material 42*m* may also comprise at least one color derived from dye, ink and/or pigment as previously described herein. Bonding materials as described above are known in the art and commercially available.

Figure 34:
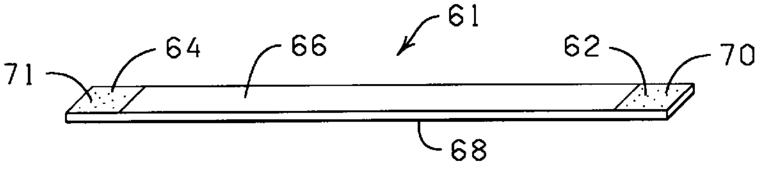
FIG. 34 is a perspective view of a band constructed in accordance with the present invention.

Shown in FIG. 34 is a band 61 constructed in accordance with the present invention. The band 61 has a first end 62 and a second end 64. The band 61 is an elongated, flat strip of flexible material having a rectangularly-shaped cross-section (FIG. 34). The band 61 preferably is constructed of any material capable of being wrapped about a portion of the sheet of material 12*m* in the manner described herein. Preferably, the band 61 is constructed of a material selected from a group of materials consisting of paper, metal foil, cloth (natural or synthetic), denim, burlap, polymer film or cling material or combinations thereof.

The thickness of the band 61 can vary widely but will generally have a thickness in the range of from about 0.1 mils to about 30 mils, preferably from about 0.1 mils to 5.0 mils. In one preferred embodiment, the band 61 is constructed of the same material as the material utilized in the construction of the sheet material 12*m*.

The band 61 has an upper surface 66 and a lower surface 68 (FIG. 34). A bonding material 70 is disposed on the upper surface 66 of the band 61. More particularly, a first bonding material 70 is disposed on the upper surface 66 of the band 61 near the first end 62 thereof; and a second bonding material 71 is disposed on the upper surface 66 of the band 61 near the second end 64 thereof.

In a general method of use, the floral arrangement 32*m* is angularly disposed on the upper surface 14*m* of the sheet of material 12*m* such that the stem portion 36*m* of the floral arrangement 32*m* overlays a portion of the bonding material 42*m* extending along the first side 20*m* of the sheet of material 12*m* substantially as shown.

Figure 35:
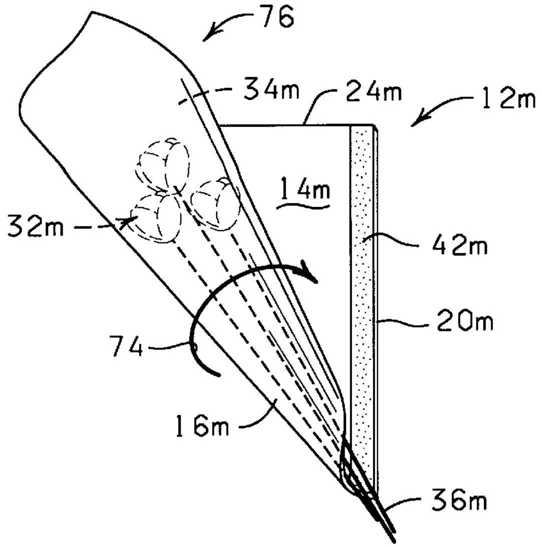
FIG. 35 is a perspective view of a floral arrangement having the sheet of material of FIG. 33 extended thereabout and having one end of the band of FIG. 34 connected thereto.

To wrap the sheet of material 12*m* about the floral arrangement 32*m* to provide a decorative covering therefor, a corner 72 of the sheet of material 12*m* is lifted and wrapped around the floral arrangement 32*m*. The floral arrangement 32 is then rolled in a rolling direction 74 toward the first side 20*m* of the sheet of material 12*m*, and thus towards the bonding material 42*m* until the floral arrangement 32*m* is disposed substantially adjacent the second side 22*m* of the sheet of material 12*m* and a portion of the first side 20*m* of the sheet of material 12*m* overlaps at least one other portion of the sheet of material 12*m*. The overlapping portions of the sheet of material 12*m* are then bonded by pressing lightly along the bonding material 42*m* so that the bonding material 42*m* on the upper surface 14*m* of the sheet of material 12*m* bondingly contacts and engages the overlapped portions of the sheet of material 12*m*, whereby the first side 20*m* of the sheet of material 12*m* is bonded to overlapping portions of the sheet of material 12*m* generally between the third side 24*m* and the fourth side 26*m* of the sheet of material 12*m* and a decorative covering 76 is formed about the floral arrangement 32*m* substantially as shown in FIG. 35. It should be noted that by providing the bonding material 42*m* along the first side 20*m* of the sheet of material 12*m*, no loose flaps are formed in the decorative covering 76 by unbonded portions of the sheet of material 12*m*.

The decorative covering 76 formed from the sheet of material 12*m* substantially encompasses and surrounds a substantial portion of the flower portion 34*m* and the stem portion 36*m* of the floral arrangement 32*m*. The decorative covering 76 formed from the sheet of material 12*m* is held about the floral arrangement 32*m* by the bonding contact of the overlapping portions of the sheet of material 12*m* and the sheet of material 12*m* is generally tightly wrapped about the stem portion 36*m* of the floral arrangement 32*m*. While the decorative covering 76 formed from the sheet of material 12*m* is depicted as a conically-shaped decorative covering (FIGS. 35 and 36), it should be understood that the sheet of material 12*m* can be wrapped about the floral arrangement 32*m* to form a substantially cylindrically-shaped decorative covering (not shown) or any other geometric, non-geometric or asymmetrical shaped decorative cover as may be desired and dictated by the shape of the sheet of material 12*m*.

Further, it should be understood that the position of the floral arrangement 32*m* on the sheet of material 12*m* can vary and will generally be dictated by the position of the flower portion of the floral arrangement 32*m* desired relative to an upper end 78 of the decorative covering 76.

The decorative cover 76 formed from the sheet of material 12*m* has an opening 80 extending through a lower end 82 thereof and an opening 84 extending through the upper end 78 thereof with the stem portion 36*m* of the floral arrangement 32*m* extending through the opening 80 in the lower end 82. The flower portion 34*m* of the floral arrangement 32*m* is enclosed by the decorative covering 76 such that the opening 84 in the upper end 78 of the decorative covering 76 extends a distance above the flower portion 34*m* of the floral arrangement 32*m* and the decorative covering 76 is loosely wrapped about the flower portion 34*m* of the floral arrangement 32*m* substantially as shown in FIG. 35.

Figure 36:
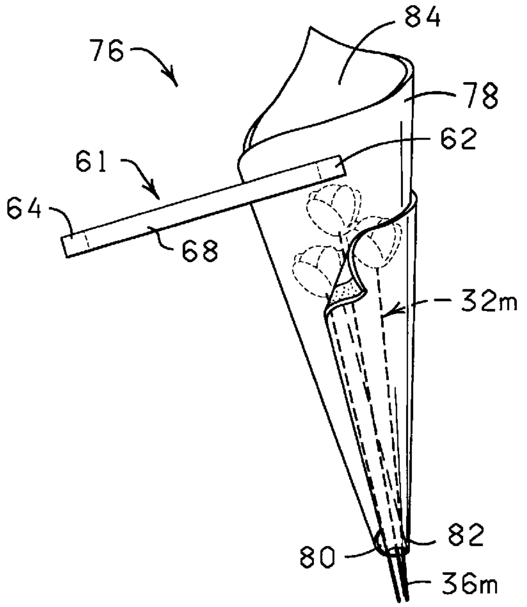
FIG. 36 is a perspective view of a floral arrangement having the sheet of material of FIG. 33 extended thereabout to provide a decorative covering for the floral arrangement wherein the band of FIG. 34 is disposed about the decorative covering for providing a crimped portion in an upper end portion of the decorative covering and for retaining the decorative covering in the crimped condition.
Figure 37:
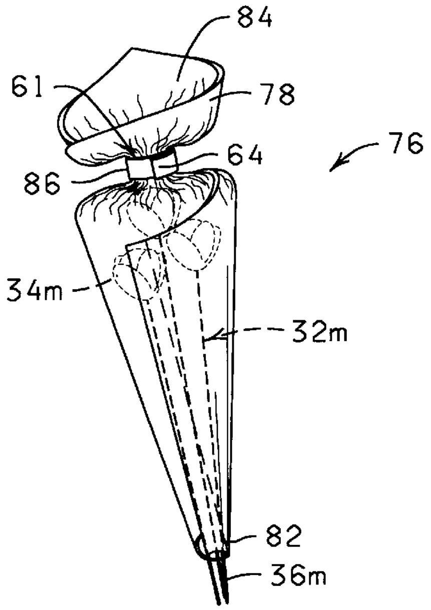
FIG. 37 is a perspective view of a floral arrangement having the sheet of material of FIG. 33 disposed thereabout and having one end of the band of FIG. 34 connected to the sheet of material so as to be extendable about a stem portion of the floral arrangement.

Referring more specifically to FIGS. 36 and 37, once the sheet of material 12*m* is extended about the floral arrangement 32*m* to provide the decorative covering 76, the first end 62 of the band 60 is bondingly connected to a portion of the decorative covering 76 by disposing the upper surface 66 of the band 61 near the first end 62 thereof adjacent a portion of the decorative covering 76 disposed above the bloom portion 34*m* of the floral arrangement 32*m* and bondingly connecting the first end 62 of the band 61 to the decorative covering via the first bonding material 70. The band 61 is then extended about a portion of the decorative covering 76 such that the band 61 pulls or draws the decorative covering 76 inward towards a central portion and thereby forms a crimped portion 86 (FIG. 37) in the decorative covering 76. The second end 64 of the band 61 is then bondingly connected to either a portion of the band 61 or to a portion of the decorative covering 76 by disposing the second bonding material 71 adjacent either a portion of the band 61 or a portion of the decorative covering 76 for bondingly connecting the second end 64 of the band 61 to either the band 61 or to the decorative covering 76.

In the embodiment shown in FIG. 37, the crimped portion 86 extends circumferentially about the decorative covering 76 at a position above the flower portion 34*m* of the floral arrangement 32*m* whereas in the embodiment shown in FIG. 38, the crimped portion 87 extends circumferentially about the decorative covering 76 at a position below the flower portion 34*m* of the floral arrangement 32*m*, i.e. about the stem portion 36*m* of the floral arrangement 32*m*. It should be noted that the band 61 may be integrally formed with the sheet of material 12*m* rather than securing the first end 62 of the band 61 to the sheet of material 12*m* via the first bonding material 70 if desired in a particular application.

Figure 39:
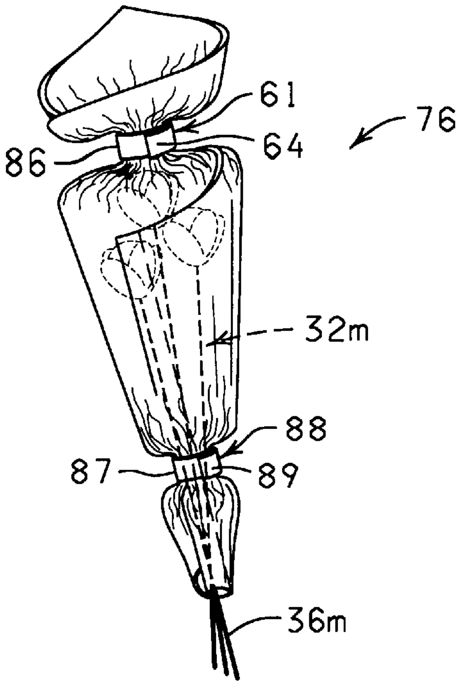
FIG. 39 is a perspective view of a floral arrangement having a sheet of material extended thereabout and having the band of FIG. 34 disposed about the decorative covering for providing a crimped portion in the upper end portion of the decorative covering and a second of the bands of FIG. 34 disposed about the lower portion of the decorative covering.

Referring now to FIG. 39, the decorative covering 76 is illustrated having the crimped portion 86 with the band 61 extending circumferentially about the decorative covering 76 at a position above the flower portion 34*m* of the floral arrangement 32*m* and a crimped portion 87 with a band 88 extending circumferentially about the decorative covering 76 at a position below the flower portion 34*m* of the floral group 32*m*, i.e. about the stem portion 36*m* of the floral arrangement 32*m*. As previously described with reference to FIGS. 36 and 37, the first end 62 of the band 61 is bondingly connected to the decorative covering 76 so as to be disposed above the flower portion 34*m* of the floral arrangement 32*m*. The band 61 is then extended about the decorative covering 76 whereby the band 61 pulls or draws the decorative covering 76 inward toward a central portion and forms the crimped portion 86 in the decorative covering 76 above the flower portion 34*m* of the floral arrangement 32*m*. The second end 64 of the band 61 is then bondingly connected to either a portion of the band 61 or to a portion of the decorative covering 76 via the bonding material 71 on the second end 64 of the band 61.

The first end (not shown) of the band 88 (which is identical in construction and function to the band 61) is bondingly connected to a portion of the decorative covering 76 disposed about the stem portion 36*m* of the floral arrangement 32*m*. The band 88 is then extended about a portion of the decorative covering 76 such that: the band 88 pulls or draws the decorative covering 76 inward towards a central portion and thereby forms the crimped portion 87 (FIG. 39) in the decorative covering 76 about the stem portion 36*m* of the floral arrangement 32*m*. A second end 89 of the band 88 is then bondingly connected to either a portion of the band 88 or to a portion of the decorative covering 76 via a bonding material (not shown) for bondingly connecting the second end 89 of the band 88 to either the band 88 or to the decorative covering 76.

Figure 38:
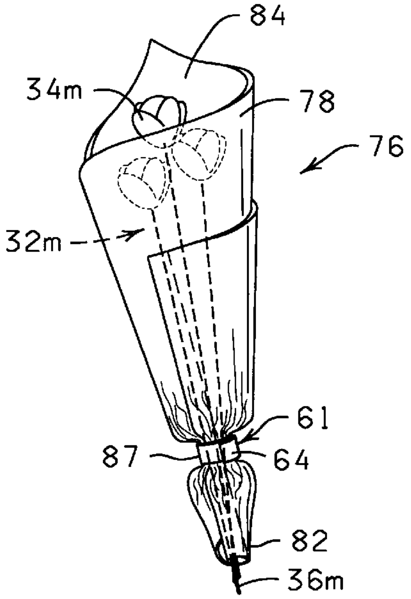
FIG. 38 is a perspective view of the decorative covering having the band of FIG. 34 disposed about a lower portion of the decorative covering for retaining the decorative covering in the crimped condition.

The crimped portion 87 extends circumferentially about the decorative covering 76 such that the crimped portion 87 extends about the stem portion 36*m* of the floral arrangement 32*m* substantially as shown in FIG. 38. Thus, the band 61 and the band 88, in combination with the crimped portions 86 and 87, secure the decorative covering 76 about the floral arrangement 32*m*. It should be noted that one or both of the bands 61 and 88 may be integrally formed with the sheet of material 12*m* rather than securing the bands 61 and 88 to the sheet of material 12*m* as heretofore described if desired in a particular application.

Figure 40:
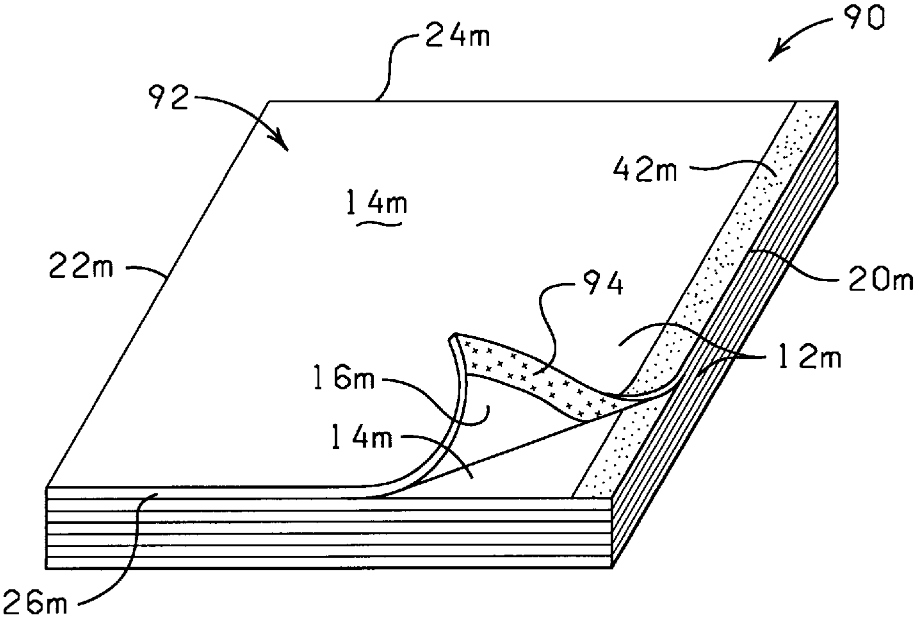
FIG. 40 is a perspective view of a pad containing a plurality of sheets of material for providing a decorative covering for a floral arrangement in accordance with the present invention.

The present invention also contemplates a plurality of sheets of material 12*m* connected together to form a pad 90 of sheets of material 12*m* as shown in FIG. 40. The pad 90 comprises a plurality of sheets of material 12*m* stacked one on top of the other and positioned so that the first sides 20*m*, the second sides 22*m*, the third sides 24*m* and the fourth sides 26*m* of the sheets of material 12*m* in the pad 90 generally are aligned. The upper surface 14*m* of each sheet of material 12*m* is disposed generally adjacent the lower surface 16*m* of an adjacent sheet of material 12*m* in the pad 90. The bonding material 42*m*, which functions to connect the sheets of material 12*m* to form the pad 90 is also employed to bond the first side 20*m* of the sheet of material 12*m* to overlapping portions of the sheet of material 12*m* when the sheet of material 12*m* is wrapped about a floral arrangement 32*m*. Thus, each of the sheets of material 12*m* in the pad 90 is releasably connected to the other sheets of material 12*m* via the bonding material 42*m* so that one or more sheets of the material 12*m* can be removed from the pad 90 by lifting one or more sheets of material 12*m* from the pad 90 and disconnecting the sheet of material 12*m* from the pad 90.

The sheets of material 12*m* are stacked in the form of the pad 90 thereby providing a top sheet of material 92 which is disposed generally on the top of the pad 90 with the other sheets of material 12*m* being disposed generally under the top sheet of material 92. To employ the top sheet of material 92 and/or one or more adjacently disposed sheets of the material 12*m* to wrap the floral arrangement 32*m* to provide a decorative cover about the floral arrangement 32*m*, the floral arrangement 32 is positioned on the top sheet of material 92 in the same manner as heretofore described with reference to FIG. 33. A portion of the top sheet of material 92 generally near the second side 22*m* thereof is then lifted and the lifted portion of the top sheet of material 92 is positioned generally about a portion of the floral arrangement 32*m*. In this position, the top sheet of material 92 and the floral arrangement 32*m* are rolled in a rolling direction 74 thereby rolling the top sheet of material 92 generally about the floral arrangement: 32*m*. The top sheet of material 92 and the floral arrangement 32 are continued to be rolled in the rolling direction 74 (FIG. 33) generally toward the first side 20*m* of the top sheet of material 92 until the floral arrangement 32*m* is disposed generally adjacent the first side 20*m* of the top sheet of material 92 in the same manner as described with reference to FIGS. 33 and 35.

As the floral arrangement 32*m* and the top sheet of material 92 are rolled over the bonding material 42*m* on the upper surface 14*m* of the top sheet of material 92, a release material 94 on lower surface 16*m* of the top sheet of material 92 enhances the disconnection of the top sheet of material 92 from the pad 90 and the bonding material 42*m* on the upper surface 14*m* of the top sheet of material 92 adhesively connects to an adjacent portion of the top sheet of material 92 thereby securing the top sheet of material 92 securely wrapped generally about the floral arrangement 32*m* so that no loose flaps are formed by unbonded portions of the top sheet of material 92.

When the top sheet of material 92 has been disposed and bondingly connected about the floral arrangement 32*m* in the manner just described, the sheet of material 12*m* generally under the top sheet of material 92 then provides a new top sheet of material 90 and the process can be repeated for wrapping additional or other floral arrangements. The floral arrangement 32*m* having a decorative cover formed from the top sheet of material 92 can then be provided with crimped portions by disposing one or more bands about the decorative covering in the manner heretofore described with reference to FIGS. 34–38 herein.

Changes may be made in the embodiments of the invention described herein, or in parts or elements of the embodiments described herein, or in the sequence of steps of the methods described herein, without departing from the spirit and/or scope of the invention as defined in the following claims.

What is claimed is:

1. A method for providing a decorative covering for a floral arrangement having a flower portion and a stem portion, comprising:

providing a sheet of material having an upper surface, a lower surface and an outer periphery;

providing a band having a first end and a second end, the band having a connecting means disposed on at least a portion thereof, at least one end of the band being connected to the sheet of material and at least one other end of the band forming an unconnected end;

wrapping the sheet of material about at least a portion of the floral arrangement such that at least the portion is encompassed by the sheet of material, forming a wrapper;

tightly wrapping a portion of the band about the wrapper so as to form a crimped portion in the wrapper at a position, the position selected from the group consisting of a position about the stem portion and a position above the flower portion; and connecting the unconnected end of the band to either a portion of the band or a portion of the wrapper via the connecting means thereby securing the band in a wrapped position and securing the crimped portion in a crimped position thereby forming a decorative covering for the floral arrangement.

2. The method of claim 1 wherein in the step of providing a sheet of material, the sheet of material is further defined as being constructed of a flexible material selected from the group of materials consisting of paper, metal foil, cloth (natural or synthetic), denim, burlap, polymer film, cling material and combinations thereof.

3. The method of claim 1 wherein in the step of providing a band, the band is further defined as being constructed of a flexible material selected from the group of materials consisting of paper, metal foil, cloth (natural or synthetic), denim, burlap, polymer film, cling material and combinations thereof.

4. The method of claim 1 wherein in the step of providing a sheet of material, the sheet of material is further defined as having a thickness in a range from about 0.1 mil to about 30 mils.

5. The method of claim 1 wherein in the step of providing a band, the band is further defined as having a thickness in a range from about 0.1 mil to about 30 mils.

6. The method of claim 1 wherein in the step of providing a band, the step further comprises providing a second band having a first end and a second end, at least one end of the second band connected to the sheet of material, at least a portion of the second band having a connecting means disposed thereon; and wherein in the step of tightly wrapping the band about the wrapper, the step further comprises tightly wrapping the second band about wrapper so as to form another crimped portion in the wrapper at another position and connecting the at least one end of the second band to either a portion of the second band or to another portion of the wrapper via the connecting means for securing the second band in the other position and thereby providing a decorative covering for the floral arrangement.

7. The method of claim 1 wherein in the step of providing a band, the band is further defined as being an integral portion of the sheet of material.

8. A method for providing a decorative covering for a floral arrangement having a flower portion and a stem portion, comprising:

providing a sheet of material having an upper surface, a lower surface and an outer periphery;

providing a band having a first end and a second end, the band having a connecting means disposed on at least a portion thereof;

wrapping the sheet of material about at least a portion of the floral arrangement such that at least the portion is encompassed by the sheet of material, forming a wrapper;

connecting at least one end of the band to the wrapper, the one end connected such that the band is wrappable about the wrapper;

tightly wrapping the band about a portion of the wrapper so as to form a crimped portion in the wrapper at a position, the position selected from the group consisting of a position about the stem portion and a position above the flower portion; and connecting at least one other end of the band to either a portion of the band or a portion of the wrapper via the connecting means thereby securing the band in a wrapped position and securing the crimped portion in a crimped position thereby forming a decorative covering for the floral arrangement.

9. The method of claim 8 wherein in the step of providing a sheet of material, the sheet of material is further defined as being constructed of a flexible material selected from the group of materials consisting of paper, metal foil, cloth (natural or synthetic), denim, burlap, polymer film, cling material and combinations thereof.

10. The method of claim 8 wherein in the step of providing a band, the band is further defined as being constructed of a flexible material selected from the group of materials consisting of paper, metal foil, cloth (natural or synthetic), denim, burlap, polymer film, cling material and combinations thereof.

11. The method of claim 8 wherein in the step of providing a sheet of material, the sheet of material is further defined as having a thickness in a range from about 0.1 mil to about 30 mils.

12. The method of claim 8 wherein in the step of providing a band, the band is further defined as having a thickness in a range from about 0.1 mil to about 30 mils.

13. The method of claim 8 wherein in the step of providing a band, the step further comprises providing a second band having a first end and a second end, at least one end of the second band connected to the sheet of material, at least a portion of the second band having a connecting means disposed thereon;

wherein in the step of connecting at least one end of the band to the wrapper, the step further comprises connecting at least one end of the second band to the wrapper, the one end connected in a position such that a remaining portion of the second band is about the floral arrangement; and wherein in the step of tightly wrapping the band about the wrapper, the step further comprises tightly wrapping the remaining portion of the second band about another portion of the wrapper so as to form another crimped portion in the wrapper at another position and connecting at least one end of the second band to either a portion of the second band or another portion of the wrapper via the connecting means for securing the second band in the other position and thereby providing a decorative covering for the floral arrangement.

14. A method for providing a decorative covering for a floral arrangement having a flower portion and a stem portion, comprising:

providing a sheet of material having an upper surface, a lower surface and an outer periphery;

providing a band having a first end and a second end, the band having a connecting means disposed on at least a portion thereof;

connecting at least one end of the band to the sheet of material, the one end connected in a position such that a remaining portion of the band extends a distance beyond the sheet of material;

wrapping the sheet of material about at least a portion of the floral arrangement such that at least the portion is encompassed by the sheet of material, forming a wrapper;

tightly wrapping the remaining portion of the band about the wrapper so as to form a crimped portion in the wrapper at a position, the position selected from the group consisting of a position about the stem portion and a position above the flower portion; and connecting at least one other end of the band to either a portion of the band or a portion of the wrapper via the connecting means thereby securing the band in a wrapped position and securing the crimped portion in a crimped position thereby forming a decorative covering for the floral arrangement.

15. The method of claim 14 wherein in the step of providing a sheet of material, the sheet of material is further defined as being constructed of a flexible material selected from the group of materials consisting of paper, metal foil, cloth (natural or synthetic), denim, burlap, polymer film, cling material and combinations thereof.

16. The method of claim 14 wherein in the step of providing a band, the band is further defined as being constructed of a flexible material selected from the group of materials consisting of paper, metal foil, cloth (natural or synthetic), denim, burlap, polymer film, cling material and combinations thereof.

17. The method of claim 14 wherein in the step of providing a sheet of material, the sheet of material is further defined as having a thickness in a range from about 0.1 mil to about 30 mils.

18. The method of claim 14 wherein in the step of providing a band, the band is further defined as having a thickness in a range from about 0.1 mil to about 30 mils.

19. The method of claim 14 wherein in the step of providing a band, the step further comprises providing a second band having a first end and a second end, at least one end of the second band connected to the sheet of material, at least a portion of the second band having a connecting means disposed thereon;

wherein in the step of connecting at least one end of the band to the sheet of material, the step further comprises connecting at least one end of the second band to the sheet of material, the one end connected in a position such that a remaining portion of the second band is about the floral arrangement; and wherein in the step of tightly wrapping the band about the wrapper, the step further comprises tightly wrapping the remaining portion of the second band about another portion of the wrapper so as to form another crimped portion in the wrapper at another position and connecting at least one end of the second band to either a portion of the second band or another portion of the wrapper via the connecting means for securing the second band in the other position and thereby providing a decorative covering for the floral arrangement.

20. A method for providing a decorative covering for a floral arrangement having a flower portion and a stem portion, comprising:

providing a sheet of material having an upper surface, a lower surface and an outer periphery, the sheet of material comprising a band, the band having a first end and a second end, at least one end of the band connected to the sheet of material, the band having a connecting means on at least a portion thereof;

wrapping the sheet of material about at least a portion of the floral arrangement such that at least the portion is encompassed by the sheet of material, forming a wrapper;

tightly wrapping a portion of the band about the wrapper so as to form a crimped portion in the wrapper at a position, the position selected from the group consisting of a position about the stem portion and a position above the flower portion; and connecting at least one other end of the band to either a portion of the band or a portion of the wrapper via the connecting means thereby securing the band in a wrapped position and securing the crimped portion in a crimped position thereby forming a decorative covering for the floral arrangement.

21. The method of claim 20 wherein in the step of providing a sheet of material, the sheet of material is further defined as being constructed of a flexible material selected from the group of materials consisting of paper, metal foil, cloth (natural or synthetic), denim, burlap, polymer film, cling material and combinations thereof.

22. The method of claim 20 wherein in the step of providing a band, the band is further defined as being constructed of a flexible material selected from the group of materials consisting of paper, metal foil, cloth (natural or synthetic), denim, burlap, polymer film, cling material and combinations thereof.

23. The method of claim 20 wherein in the step of providing a sheet of material, the sheet of material is further defined as having a thickness in a range from about 0.1 mil to about 30 mils.

24. The method of claim 20 wherein in the step of providing a band, the band is further defined as having a thickness in a range from about 0.1 mil to about 30 mils.

25. The method of claim 20 wherein in the step of providing a band, the step further comprises providing a second band having a first end and a second end, at least one end of the second band connected to the sheet of material, at least a portion of the second band having a connecting means disposed thereon; and wherein in the step of tightly wrapping the band about the wrapper, the step further comprises tightly wrapping the second band about another portion of the wrapper so as to form another crimped portion in the wrapper at another position and connecting at least one end of the second band to either a portion of the second band or another portion of the wrapper via the connecting means for securing the second band in the other position and thereby providing a decorative covering for the floral arrangement.

26. The method of claim 20 wherein in the step of providing a band, the band is further defined as comprising a separate sheet of material.

* * * * *

UNITED STATES PATENT AND TRADEMARK OFFICE
CERTIFICATE OF CORRECTION

PATENT NO. : 5,974,765
DATED : November 2, 1999
INVENTOR(S) : Donald E. Weder et al.

It is certified that error appears in the above-identified patent and that said Letters Patent is hereby corrected as shown below:

Column 3,
Line 2, delete the word “at.”

Column 4,
Line 49, delete the word “markets” and substitute therefore the word -- marketed --.
Line 53, insert the word -- a -- between the words, about sheet.

Column 5,
Line 5, delete the word “operators” and substitute therefore the word -- operator’s --.

Column 7,
Line 29, delete the phrase “surrounded and compass” and insert -- surround and encompass --.

Column 9,
Line 62, delete the numeral “50” in the first occurrence and substitute therefore the numeral -- 51 --.

Column 10,
Line 52, delete the numeral “70” and substitute therefore the numeral -- 53c --.

Column 15,
Line 48, delete the phrase “strip of”.

Column 16,
Line 45, delete the numeral “70k” and substitute therefore the numeral -- 53k --.

Column 19,
Line 15, delete the numeral “32” and substitute therefore the numeral -- 32m --.

Column 20,
Line 44, delete the word “group” and substitute therefore the word -- arrangement --.

Column 21,
Line 47, delete the numeral “32” and substitute therefore the numeral -- 32m --.

UNITED STATES PATENT AND TRADEMARK OFFICE
CERTIFICATE OF CORRECTION

PATENT NO. : 5,974,765
DATED : November 2, 1999
INVENTOR(S) : Donald E. Weder et al.

It is certified that error appears in the above-identified patent and that said Letters Patent is hereby corrected as shown below:

Column 22,
Line 12, delete the numeral "90" and substitute therefore the numeral -- 92 --.

Signed and Sealed this

Eleventh Day of June, 2002

Attest:

JAMES E. ROGAN

*Attesting Officer* *Director of the United States Patent and Trademark Office*